US008498195B1

(12) United States Patent
Lee et al.

(10) Patent No.: US 8,498,195 B1
(45) Date of Patent: Jul. 30, 2013

(54) HARQ RETRANSMISSION SCHEME FOR AT LEAST TWO TRANSMIT ANTENNAS

(75) Inventors: Jungwon Lee, Cupertino, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 307 days.

(21) Appl. No.: 12/059,945

(22) Filed: Mar. 31, 2008

Related U.S. Application Data

(60) Provisional application No. 60/909,120, filed on Mar. 30, 2007.

(51) Int. Cl.
*H04J 11/00* (2006.01)

(52) U.S. Cl.
USPC .......................................... 370/208; 370/209

(58) Field of Classification Search
USPC .................................. 370/208, 209
See application file for complete search history.

(56) References Cited

U.S. PATENT DOCUMENTS

| | | | |
|---|---|---|---|
| 6,185,258 B1 | 2/2001 | Alamouti et al. | |
| 6,567,388 B1 | 5/2003 | Tomcik et al. | |
| 6,687,492 B1 | 2/2004 | Sugar et al. | |
| 6,778,619 B2 | 8/2004 | Zangi et al. | |
| 6,868,520 B1 | 3/2005 | Fauconnier | |
| 6,892,341 B2 | 5/2005 | Golitschek et al. | |
| 6,967,598 B2 * | 11/2005 | Mills | 341/50 |
| 7,031,419 B2 | 4/2006 | Piirainen | |
| 7,194,237 B2 | 3/2007 | Sugar et al. | |
| 7,295,624 B2 * | 11/2007 | Onggosanusi et al. | 375/267 |
| 7,308,047 B2 | 12/2007 | Sadowsky | |
| 7,362,815 B2 | 4/2008 | Lindskog et al. | |
| 7,366,247 B2 | 4/2008 | Kim et al. | |
| 7,382,841 B2 | 6/2008 | Ohtaki et al. | |
| 7,428,269 B2 | 9/2008 | Sampath et al. | |
| 7,489,746 B1 | 2/2009 | Awater et al. | |
| 7,502,432 B2 | 3/2009 | Catreux et al. | |
| 7,526,038 B2 | 4/2009 | McNamara | |

(Continued)

FOREIGN PATENT DOCUMENTS

| | | |
|---|---|---|
| EP | 1271835 | 1/2003 |
| EP | 1501210 | 1/2005 |

(Continued)

OTHER PUBLICATIONS

Zhou et al., Subspace (Semi-)Blind Channel Estimation for Block Precoded Space Time OFDM, May 2002, IEEE. Transactions on Signal Processing, vol. 50,pp. 1-14.*

(Continued)

*Primary Examiner* — Mark Rinehart
*Assistant Examiner* — Angel Brockman

(57) ABSTRACT

Systems and methods are provided for employing a HARQ retransmission scheme in a time invariant MIMO transmission channel with two inputs. During odd-numbered transmission attempts of information bearing signal s, the original signal s is sent. During even-numbered transmission attempts, a signal š that is different from but represents the same information as s is sent. By alternating between two different signals during retransmission, diversity gain is introduced. Information bearing signals s and š may also be subjected to precoding before transmission. The result of precoding is a channel that effectively changes with time. A receiver that operates using this retransmission scheme may use the information from some or all of the transmission attempts. The receiver may include a pre-processor for space-time codes that effectively converts š into an s representation.

22 Claims, 16 Drawing Sheets

U.S. PATENT DOCUMENTS

| | | | |
|---|---|---|---|
| 7,539,274 | B2 | 5/2009 | Catreux et al. |
| 7,548,592 | B2 | 6/2009 | Wight |
| 7,554,985 | B2 | 6/2009 | Ihm et al. |
| 7,567,583 | B2 | 7/2009 | Miyoshi |
| 7,590,204 | B2 | 9/2009 | Monsen |
| 7,593,489 | B2 | 9/2009 | Koshy et al. |
| 7,649,953 | B2 | 1/2010 | Bauch |
| 7,729,411 | B2 | 6/2010 | Wang et al. |
| 7,742,550 | B2 | 6/2010 | Olesen et al. |
| 7,751,506 | B2 | 7/2010 | Niu et al. |
| 7,782,971 | B2 | 8/2010 | Burg et al. |
| 7,826,557 | B2 | 11/2010 | Li et al. |
| 7,885,364 | B2 | 2/2011 | Ito |
| 2003/0012318 | A1 | 1/2003 | Piirainen |
| 2004/0049725 | A1 | 3/2004 | Golitschek et al. |
| 2004/0077378 | A1 | 4/2004 | Kim et al. |
| 2004/0181419 | A1 | 9/2004 | Davis et al. |
| 2005/0117520 | A1 | 6/2005 | Miyoshi |
| 2005/0141644 | A1 | 6/2005 | Sadowsky |
| 2006/0039299 | A1* | 2/2006 | Ihm et al. ............... 370/254 |
| 2006/0107167 | A1* | 5/2006 | Jeong et al. ............ 714/748 |
| 2006/0165192 | A1 | 7/2006 | Ito |
| 2006/0171295 | A1* | 8/2006 | Ihm et al. ............... 370/208 |
| 2006/0245476 | A1 | 11/2006 | Wang et al. |
| 2006/0251156 | A1 | 11/2006 | Grant et al. |
| 2006/0274836 | A1 | 12/2006 | Sampath et al. |
| 2007/0127603 | A1 | 6/2007 | Niu et al. |
| 2007/0268988 | A1 | 11/2007 | Hedayat et al. |
| 2008/0025427 | A1 | 1/2008 | Lee et al. |
| 2008/0025429 | A1 | 1/2008 | Lee et al. |
| 2008/0025443 | A1 | 1/2008 | Lee et al. |
| 2008/0037670 | A1 | 2/2008 | Lee et al. |
| 2008/0063103 | A1 | 3/2008 | Lee et al. |
| 2008/0144733 | A1* | 6/2008 | ElGamal et al. ........ 375/267 |
| 2008/0198941 | A1 | 8/2008 | Song et al. |
| 2009/0031183 | A1 | 1/2009 | Hoshino et al. |
| 2009/0063106 | A1 | 3/2009 | Burg et al. |
| 2009/0080579 | A1 | 3/2009 | Fuji |
| 2009/0252236 | A1 | 10/2009 | Li et al. |
| 2009/0307558 | A1* | 12/2009 | Lee et al. ............... 714/749 |
| 2010/0014601 | A1 | 1/2010 | Mo et al. |

FOREIGN PATENT DOCUMENTS

| | | | |
|---|---|---|---|
| EP | 1608081 | * | 8/2005 |
| WO | WO 00-52873 | | 9/2000 |
| WO | WO 00/52873 | | 9/2000 |
| WO | WO 02/067491 | | 8/2002 |
| WO | WO 02-067491 | | 8/2002 |

OTHER PUBLICATIONS

Arkhipov, Alexander et al. "OFDMA-CDM performance enchancement H-ARQ and interference cancellation" IEEE Journal on Selected Areas in Communications, vol. 24, pp. 1199-1207 (May 30, 2006).

Cioffi, John et al. "Generalized decision-feedback equalization for packet transmission with ISI and gaussian noise" Communications, computation, control and signal processing: a tribute to Thomas Kailath, pp. 79-127 (1997).

Davis, Linda M. "Scaled and decoupled Cholesky and QR decompositions with application to spherical MIMO detection" IEEE Wireless Communications and Networking, vol. 1, pp. 326-331 (2003).

Dekorsy, Armin "A cutoff rate based cross-layer metric for MIMO-HARQ transmission" IEEE 16th Internal Symposium on Personal, Indoor and Mobile Radio Communications, vol. 4, pp. 2166-2170 (2005).

Gharavi-Alkhansari, Mohammad et al. "Constellation Space Invariance of Space-Time Block Codes with Application to Optimal Antenna Subset Selection" Signal Processing Advances in Wireless Communications, pp. 269-273 (2003).

Ginis, George et al. "On the relation between V-BLAST and the GDFE" IEEE Communications Letters, vol. 5, pp. 264-266 (2001).

Hassibi, Babak "An efficient square-root algorithm for BLAST" IEEE International Conference on Acoustics, Speech, and Signal Processing, vol. 2, pp. 737-740 (2000).

Liu, Peng et al. "A new efficient MIMO detection algorithm based on Cholesky decomposition," The 6th International Conference on Advanced Communication Technology, vol. 1, pp. 264-268 (2004).

Nakajima, Akinori et al. "Throughput of turbo coded hybrid ARQ using single-carrier MIMO multiplexing" IEEE 61st Vehicular Technology Conference, vol. 1, pp. 610-614 (2005).

Oh, Mi-Kyung et al. "Efficient hybrid ARQ with space-time coding and low-complexity decoding" IEEE Conference on Acoustics, Speechc, and Signal Processing, vol. 4, pp. 589-592 (2004).

Rontogiannis, Athanasios A. et al. "An Adaptive Decision Feedback Equalizer for Time-Varying Frequency Selective MIMO Channels" IEEE 7th Workshop on Selective MIMO Channels Signal Processing Advances in Wireless Communications, pp. 1-5 (Jul. 2006).

Theofilakos, Panagiotis et al. "Frobenius Norm Based Receive Antenna Subarray Formation for MIMO Systems" First European Conference on Antennas and Propagation, pp. 1-5 (2006).

Wolniansky, P.W. et al. "V-BLAST: an architecture for realizing very high data rates over the rich-scattering wireless channel" URSI International Symposium on Signals, Systems, and Electronics, pp. 295-300 (1998).

Wübben, Dirk et al. "MMSE extension of V-BLAST based on sorted QR decomposition" IEEE 58th Vehicular Technology Conference, vol. 1, pp. 508-512 (2003).

Nakajima, Akinori et al. "Iterative Joint PIC and 2D MMSE-FDE for Turbo-coded HARQ with SC-MIMO Multiplexing" IEEE 63rd Vehicular Technology Conference, vol. 5, pp. 2503-2507 (May 2006).

Jang et al. "An Efficient Symbol-Level Combining Scheme for MIMO Systems With Hybrid ARQ", IEEE Transactions on Wireless Communications, vol. 8, pp. 2443-2451, May 26, 2009.

Wu, J. et al., "The Performance of TCM 16-QAM with Equalization, Diversity, and Slow Frequency Hopping for Wideband Mobile Communications", 1998, Personal, Indoor and Mobile Radio Communication, vol. 3, pp. 1346-1350.

Alamouti, Siavash, M. "A Simple Transmit Diversity Technique for Wireless Communications." IEEE Journal on Select Areas in Communications, vol. 16, No. 8. (Oct. 1998).

International Search Report dated May 8, 2008, PCT Application No. PCT/US2007/019857.

International Search Report dated Apr. 11, 2008, PCT Application No. PCT/US2007/017861.

Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).

Kim, Woo Tae et al. Performance of STBC with Turbo Code in HARQ Scheme for Mobile Communication System. Telecommunications, 2003. ICT 2003. 10th International Conference, pp. 85-59 (Feb. 23, 2003).

Onggosanusi, Eko N. et al. "Hybrid ARQ Transmission and Combining for MIMO systems" IEEE. (2003).

802.16e: IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands (Feb. 2006).

Acolatse, Kodzovi et al. "An Alamouti-based Hybrid-ARQ Scheme for MIMO Systems" 14th IST Mobile and Wireless Communications, Dresden (Jun. 2005).

Acolatse, Kodzovi et al. "Space Time Block Coding HARQ scheme for Highly Frequency Selective Channels" 2007 IEEE International Conference on Communications, pp. 4416-4420 (Jun. 24, 2007).

Chase, David. "Code Combining—A Maximum-Likelihood Decoding Approach for Combining an Arbitrary Number of Noisy Packets" IEEE Transactions on Communications, vol. Comm-33 No. 5, pp. 385-393 (May 1985).

Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).

Kim, Woo Tai et al. Performance of STBC with Turbo Code in HARQ Scheme for Mobile Communication System. Telecommunications, 2003. ICT 2003. 10th International Conference, pp. 85-59 (Feb. 23, 2003).

Koike T., et al. "Hybrid ARQ scheme suitable for coded MIMO transmission" Communications, IEEE International Conference, Paris, France, pp. 2919-2923 (Jun. 20, 2004).

Krishnaswamy, Dilip, et al. "Multi-Level Weighted Combining of Retransmitted Vectors in Wireless Communications." IEEE VTC (Sep. 2006).

Nagareda R et al. "OFDM mobile packet transmission system with multiuser detection and metric combining ARQ" Vehicular Technology Conference, 2004 VTC2004-Fall. 2004 IEEE 60th Los Angeles, CA USA, pp. 709-713 (Sep. 26, 2004).

Onggosanusi, Eko N. et al. "Hybrid ARQ Transmission and Combining for MIMO systems" 2003 International Conference on Communications, pp. 3205-3209 (May 11, 2003).

Samra H; Zhi Ding "New MIMO ARQ protocols and joint detection via sphere decoding" IEEE Transactions on Signal Processing [online] Feb. 28, 2006, pp. 473-482.

Samra Harvino, Ding Zhi "Sphere decoding for retransmission diversity in MIMO flat-fading channels" ICASSP IEEE Int. Conf. Acoust. Speech Signal Process [online], pp. 585-588 (May 17, 2004).

Schmitt M.P. "Improved retransmission strategy for hybrid ARQ schemes employing TCM" Wireless Communications and Networking Conference, 1999 IEEE New Orleans, LA, pp. 1226-1228 (Sep. 21, 1999).

Tirkkonen, O et al. "Square-Matrix Embeddable Space-Time Block Codes for Complex Signal Constellations," IEEE Trans. Info. Theory, vol. 48, pp. 384-395 (Feb. 2002).

Tong, Wen et al. Soft packet combing for STC re-transmission to improve H-ARQ performance in MIMO mode. Proposal for IEEE 802.16 Broadband Wireless Access Working Group, pp. 1-5 (Jul. 7, 2004).

* cited by examiner $$\begin{bmatrix} \mathbf{y}^{(1)} \\ \vdots \\ \mathbf{y}^{(p)} \end{bmatrix} = \begin{bmatrix} \mathbf{H}^{(1)} \\ \vdots \\ \mathbf{H}^{(p)} \end{bmatrix} \mathbf{s} + \begin{bmatrix} \mathbf{n}^{(1)} \\ \vdots \\ \mathbf{n}^{(p)} \end{bmatrix}$$

$$\begin{bmatrix} \mathbf{y}^{(1)} \\ \tilde{\mathbf{y}}^{(2)} \\ \vdots \\ \mathbf{y}^{(p-2)} \\ \tilde{\mathbf{y}}^{(p-1)} \\ \mathbf{y}^{(p)} \end{bmatrix} = \begin{bmatrix} \mathbf{H}^{(1)} \\ \tilde{\mathbf{H}}^{(2)} \\ \vdots \\ \mathbf{H}^{(p-2)} \\ \tilde{\mathbf{H}}^{(p-1)} \\ \mathbf{H}^{(p)} \end{bmatrix} \mathbf{s} + \begin{bmatrix} \mathbf{n}^{(1)} \\ \tilde{\mathbf{n}}^{(2)} \\ \vdots \\ \mathbf{n}^{(p-2)} \\ \tilde{\mathbf{n}}^{(p-1)} \\ \mathbf{n}^{(p)} \end{bmatrix}$$

311 · 312 · 305 · 313

$$\tilde{\mathbf{y}}^{(i)} = \begin{bmatrix} y_1^{(i)*} & \cdots & y_{N_r}^{(i)*} \end{bmatrix}$$

$$\tilde{\mathbf{H}}^{(i)} = \begin{bmatrix} h_{1,2}^{(i)*} & -h_{1,1}^{(i)*} \\ \vdots & \vdots \\ h_{N_r,2}^{(i)*} & -h_{N_r,1}^{(i)*} \end{bmatrix}$$

$$\tilde{\mathbf{n}}^{(i)} = \begin{bmatrix} n_1^{(i)*} & \cdots & n_{N_r}^{(i)*} \end{bmatrix}$$

FIG. 3B

$$\underbrace{\begin{bmatrix} \tilde{y}^{(1)} \\ \tilde{y}^{(2)} \\ \vdots \\ \tilde{y}^{(p-1)} \\ \tilde{y}^{(p)} \end{bmatrix}}_{511} = \underbrace{\begin{bmatrix} \tilde{H}_e^{(1)} \\ \tilde{H}_e^{(2)} \\ \vdots \\ \tilde{H}_e^{(p-1)} \\ \tilde{H}_e^{(p)} \end{bmatrix}}_{512} \cdot s + \underbrace{\begin{bmatrix} \tilde{n}^{(1)} \\ \tilde{n}^{(2)} \\ \vdots \\ \tilde{n}^{(p-1)} \\ \tilde{n}^{(p)} \end{bmatrix}}_{513}$$

$$\tilde{y}^{(i)} = \begin{bmatrix} y_1^{(i)*} \\ \vdots \\ y_{N_r}^{(i)*} \end{bmatrix} \quad \tilde{H}_e^{(i)} = \begin{bmatrix} h_{e,1,2}^{(i)*} & \cdots & -h_{e,1,1}^{(i)*} \\ \vdots & & \vdots \\ h_{e,N_r,2}^{(i)*} & \cdots & -h_{e,N_r,1}^{(i)*} \end{bmatrix} \quad \tilde{n}^{(i)} = \begin{bmatrix} n_1^{(i)*} \\ \vdots \\ n_{N_r}^{(i)*} \end{bmatrix}$$

FIG. 5

HARQ RETRANSMISSION SCHEME FOR AT LEAST TWO TRANSMIT ANTENNAS

CROSS-REFERENCE TO RELATED APPLICATIONS

This application claims benefit under 35 U.S.C. §119(e) of U.S. Provisional Application No. 60/909,120, filed Mar. 30, 2007, which is hereby incorporated herein by reference in its entirety.

BACKGROUND OF THE INVENTION

In general, the invention relates to error correcting data transmission schemes. In particular, the invention relates to retransmission schemes for MIMO systems with two transmit antennas.

In a data transmission or storage system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and/or receiver, and of their respective components.

However, the transmitter may be unaware of how the channel will affect a transmitted signal, and may not be able to transmit information in a way that will be effective for a particular channel. For example, the transmitter may be a wireless router, where the channel varies depending on its surroundings. One technique to increase reliability when the transmitter does not have information about the channel is to increase the number of outputs (e.g., transmit antennas) that transmit the same information. Thus, the same information may travel through multiple paths, allowing the receiver or receivers to more reliably estimate the transmitted information. This transmission technique is referred to as transmit diversity, and a system with multiple outputs (e.g., transmit antennas) and multiple inputs (e.g., receiver antennas) is commonly referred to as a multiple-input multiple-output (MIMO) system.

Instead of or in addition to employing a transmit diversity scheme, a transmission/storage system may use an error correction scheme to increase reliability. An error correction scheme functions by adding redundancy to the transmitted information. Therefore, when a reasonably small number of errors occur, there is still enough information to make an accurate determination of the transmitted sequence. The redundancy added to the transmitted information is determined based on an error correction code, such as a Reed-Solomon or Golay code.

One straightforward way to implement an error correction scheme is to use forward error correction (FEC). The transmitter encodes the data according to an error correction code and transmits the encoded information. Upon reception of the data, the receiver decodes the data using the same error correction code, ideally eliminating any errors. Therefore, "decoding" is hereinafter referred to as a method for producing an estimate of the transmitted sequence in any suitable form (e.g., a binary sequence, a sequence of probabilities, etc).

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). One type of HARQ, referred to as HARQ type-I, typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, it first attempts FEC by decoding the error correction code. If, after error detection, there are still errors present, the receiver will request a retransmission of that packet. Otherwise, it accepts the received vector.

A deficiency in conventional ARQ and HARQ schemes for MIMO and other types of systems is that the same signal is sent during the original transmission and subsequent retransmission(s). In time invariant channels, which are channels with properties that do not substantially change over time, a large number of retransmissions may be necessary to secure a successful transmission. Moreover, the system's diversity gain, the advantageous reduction in necessary transmission power that occurs when a diversity scheme (e.g., transmit diversity) is introduced to a system, may decrease and lead to performance degradation. Thus, it would be desirable to provide novel retransmission schemes that can reliably and efficiently function in time invariant channels.

SUMMARY OF THE INVENTION

Accordingly, systems and methods for retransmitting an information bearing signal through a MIMO transmission channel are disclosed.

The transmitter in a data transmission system that is in accordance with the principles of the present invention may include two transmit antennas. The transmitter may transmit signals of the form $x=[x_1 \ x_2]$, where each component of the vector signal x corresponds to the output of one antenna. That is, $x_1$ may be a signal that is transmitted from a first antenna, and $x_2$ may be transmitted from a second antenna. During the first (original) transmission of a particular information bearing signal $s=[s_1 \ s_2]$, the transmitter may transmit $s_1$ from the first antenna and $s_2$ from the second antenna: $x=[x_1 \ x_2]=s=[s_1 \ s_2]$.

If the data transmission system employs an ARQ or HARQ retransmission scheme, the transmitter may execute a retransmission if it receives a failed transmission signal from its corresponding receiver. A failed transmission is one where the receiver cannot reconstruct the transmitted signal. If the data transmission system instead employs a repetition coding retransmission scheme, the transmitter may execute a fixed number of retransmissions.

In contrast to conventional retransmission schemes, the transmitter may transmit an altered version of information bearing signal s on the second and subsequent transmission attempts. In particular, on even-numbered transmission attempts, the transmitter may transmit $š=[-s_2^* \ s_1^*]$, where $-s_2^*$ is the negative conjugate inverse of $s_2$, and $s_1^*$ is the conjugate inverse of $s_1$. Thus, on the even-numbered attempts, $x=\check{s}$. On odd-numbered transmission attempts, including the first transmission, the transmitter may transmit the original signal: $x=s$. Thus, although s is transmitted in different forms, redundant information is provided on each retransmission attempt. This type of transmission scheme is sometimes referred to as space-time coding.

It is advantageous to alternate between two different signals when retransmitting data in a channel that is time invariant over the appropriate time scale (usually on the order of milliseconds) because it is likely that each retransmission will encounter the same corrupting properties that caused the original transmission to fail. It is particularly beneficial for the altered signal $\check{s}$ to be orthogonal to s, because even if s and $\check{s}$ are subjected to the same noise during transmission, they may be corrupted in different ways. This may allow at least one of the transmitted signals to be accurately interpreted by a corresponding receiver.

In another embodiment of the invention, the information bearing signals s and $\check{s}$ may first undergo a precoding procedure before transmission, such as a linear precoding procedure. During precoding, the information bearing signal may be multiplied by a precoding matrix $A^{(i)}$ according to the following equation:

$$x^{(i)} = \begin{cases} A^{((i+1)/2)} s & \text{for } i = 1, 3, \ldots \\ A^{(i/2)} \check{s} & \text{for } i = 2, 4, \ldots \end{cases}$$

where i is the transmission attempt number. For each pair of transmissions 2n−1 and 2n, where n is an positive integer, the same precoding matrix $A^{(n)}$ is used. For example, for transmission attempts 3 and 4, the precoding matrix $A^{(2)}$ is used. Since the same precoding matrix is applied to s and $\check{s}$ during transmission attempts 3 and 4, the orthogonality between the signal of the third transmission attempt, $x^{(3)}=A^{(2)}s$, and the fourth transmission attempt, $x^{(4)}=A^{(2)}\check{s}$, is preserved. Precoding also creates an effective channel that changes after every two transmission attempts. Thus, precoding advantageously introduces some time variance to the effective channel, thereby increasing the diversity gain available for retransmission.

The corresponding receiver for either of the transmitter embodiments described above can include a plurality of receive antennas, and can receive a signal corresponding to either s or $\check{s}$ from each receive antenna depending on the transmission attempt. The receiver can include a pre-preprocessor for space-time codes that is configured to process each of the received signals. The pre-processor can convert each received signal corresponding to $\check{s}$ such that the resulting pre-processed signal may be expressed in terms of s. Thus, the pre-processor may produce signal vectors that are all of the same format. After performing pre-processing, the receiver can use any suitable HARQ combining (e.g., maximal-ratio combining) and decoding (zero-forcing (ZF), minimum-mean-squared-error (MMSE), maximum-likelihood (ML)) approach to estimate the actual data represented by the information bearing signal, s.

In some embodiments, the transmitter in a data transmission system that is in accordance with the principles of the present invention may include more than two transmit antennas. In this case, the transmitter may employ a space-time code that utilizes the additional spatial dimensions. For example, the following equations demonstrate an illustrative space-time code for four transmit antennas:

$$x^{(1)} = \begin{bmatrix} x_1 \\ x_2 \\ x_3 \\ x_4 \end{bmatrix} = s = \begin{bmatrix} s_1 \\ s_2 \\ s_3 \\ 0 \end{bmatrix}$$

$$x^{(2)} = \begin{bmatrix} x_1 \\ x_2 \\ x_3 \\ x_4 \end{bmatrix} = s' = \begin{bmatrix} -s_2^* \\ s_1^* \\ 0 \\ -s_3 \end{bmatrix}$$

$$x^{(3)} = \begin{bmatrix} x_1 \\ x_2 \\ x_3 \\ x_4 \end{bmatrix} = s'' = \begin{bmatrix} -s_3^* \\ 0 \\ s_1^* \\ s_2 \end{bmatrix}$$

$$x^{(4)} = \begin{bmatrix} x_1 \\ x_2 \\ x_3 \\ x_4 \end{bmatrix} = s''' = \begin{bmatrix} 0 \\ s_3^* \\ -s_2^* \\ s_1 \end{bmatrix}$$

Here the transmitter may transmit signals of the form $x=[x_1\ x_2\ x_3\ x_4]$, where each component of the vector signal x corresponds to the output of one antenna. The superscript on x indicates the time slot during which the signal is transmitted. That is, $x^{(i)}$ is the signal vector that is transmitted in the $i^{th}$ time slot. Thus, rather than alternately transmitting two different signal vectors s and $\check{s}$ like in the two antenna embodiment, four different signal vectors s, s', s", and s''' are transmitted in turn. Like in the two transmit antenna case, signal vectors s, s', s", and s''' are different but represent the same information.

This particular example illustrates a space-time code with spatial rate 3/4, since three data symbols ($s_1$, $s_2$, and $s_3$) are transmitted over four antennas ($x_1$, $x_2$, $x_3$, and $x_4$). However, other types of space-time codes for an arbitrary number of transmit antennas can also be used with the present data transmission system.

Furthermore, in some embodiments, the transmitter can precode the transmitted signal vectors using a precoding matrix prior to transmission. Like in the two transmit antenna case, the transmitter may alter the precoding matrix after each of the different representations has been transmitted once to include additional time variance.

A corresponding receiver can be used to receive and decode the different representations of s that are transmitted using a retransmission scheme. The receiver can include at least one receive antenna, where each antenna is configured to receive a signal containing information on symbols transmitted from more than two transmit antennas. Each receive antenna may also be configured to obtain different representations of the symbols on different transmission attempts of the retransmission scheme. The receiver can include a pre-processor configured to process the different representations of s to produce, for each of the transmission attempts, a processed signal vector of the same format (e.g., a signal vector expressed in terms of s). The processed signal vector for each transmission attempt can be combined by a combiner into a combined signal vector. The receiver can include a decoder to decode the combined signal vector. The decoder may be, for example, a ZF, MMSE, or ML decoder.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which:

FIG. 3A is a vector model of a conventional MIMO system;

FIG. 3B is a vector model of the MIMO system embodied in FIGS. 2A, 2B, and 2C;

FIG. 5 is a vector model of the MIMO system embodied in FIG. 4;

DETAILED DESCRIPTION OF THE INVENTION

The disclosed invention provides techniques for HARQ retransmission in a two or more transmit antenna MIMO system.

Figure 1:
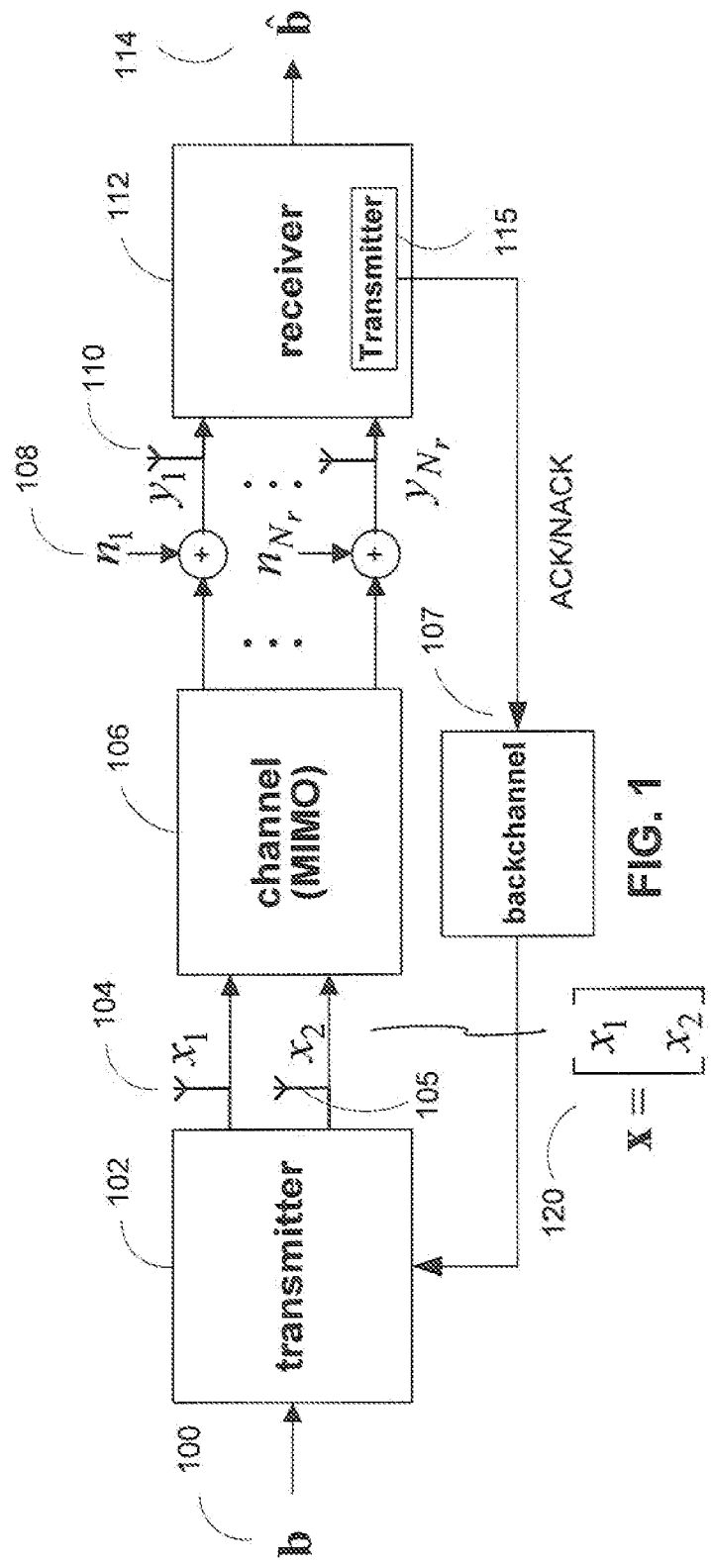
FIG. 1 is a high level block diagram of a multiple-input multiple-output data transmission or storage system.

FIG. 1 shows an illustration of a basic data transmission or storage system in accordance with one embodiment of the present invention. The system of FIG. 1 can include transmitter 102 and receiver 112, where information bearing signals produced by transmitter 102 can be transferred to receiver 112 through channel 106. In some embodiments, the illustrated system may represent a wireless communication system. In these embodiments, transmitter 102 may be a wireless router and receiver 112 may be a wireless receiver.

Transmitter 102 can process and send bit sequence b 100 through channel 106 to receiver 112. Although the present invention is described in terms of binary data, it is understood that bit sequence 100 may be replaced with a sequence of nonbinary digits or another type of information-containing data without departing from the scope of the invention. Bit sequence 100 may be uncoded or may be the output of an encoder unit (not pictured) that employs an error correction or error detection code. Alternatively, an encoder unit internal to transmitter 102 may function to encode bit sequence 100 with an error correction or error detection code before transmission.

Transmitter 102 may transmit bit sequence 100 or an encoded version of bit sequence 100 through channel 106 as signals $x_1$ and $x_2$. Signals $x_1$ and $x_2$ may be based on any appropriate modulation scheme, such as orthogonal frequency division multiplexing (OFDM), quadrature amplitude modulation (QAM), pulse amplitude modulation (PAM), or phase shift keying (PSK). To transmit $x_1$ and $x_2$ concurrently, transmitter 102 may include two transmit antennas 104 and 105, where transmit antenna 104 may transmit signal $x_1$ and transmit antenna 105 may transmit signal $x_2$. For convenience, signals $x_1$ and $x_2$ may be collectively referred to as transmit signal vector x 120. In other embodiments, transmitter 102 can include more two transmit antennas. In these scenarios, transmit signal vector x can have components $x_1, \ldots x_{N_t}$, where each $x_i$ is a different signal that transmitter 102 may output, and $N_t$ is an integer greater than two that equals the number of transmit antennas. Particular embodiments of transmitter 102 with two transmit antennas in accordance with an embodiment of the present invention are described in FIG. 2A and FIG. 4.

With continued reference to FIG. 1, which depicts transmitter 102 with two transmit antennas, signals $x_1$ and $x_2$ may be altered during transmission (or storage) by a transmission (or storage) medium, represented by channel 106, and/or additive noise sources 108. In a wireless communication system, for example, channel 106 may be the physical space between the wireless transmitter and receiver. Channel 106 can obstruct and attenuate the transmitted signals due to at least time-varying multipath fades and shadowing effects. Additive noise sources 108 may, for example, be ambient electromagnetic interference. In some scenarios, noise sources 108 may be modeled as additive white Gaussian noise (AWGN) with zero mean. Also, in many applications, channel 106 may be time invariant, meaning that the properties of the channel do not substantially change over an appropriate time scale. In real time data transmission systems, an appropriate time scale may be in the millisecond range.

Receiver 112 may include $N_r$ antennas 110 from which signals $y_1$ through $y_{N_r}$ are received. Receiver 112 may include any suitable number of receive antennas, and therefore $N_r$ may be any integer of at least one. Signals $y_1$ through $y_{N_r}$ may include information from one or both of signals $x_1$ and $x_2$ that have been attenuated and/or corrupted by channel 106 and noise sources 108. Receiver 112 may then process the received signals to produce output bit sequence 114. The processing done by receiver 112 may include demodulation and decoding. Alternatively, output bit sequence 114 may be directed to a decoder (not shown) external to receiver 112.

Because of the multiple transmit antennas of transmitter 102 and the possibly multiple receive antennas of receiver 112, channel 106 may sometimes be referred to as a MIMO channel with two inputs (from transmitter 102) and $N_r$ outputs (to receiver 112), or simply a $2 \times N_r$ MIMO channel. More generally, channel 106 may be an $N_t \times N_r$ MIMO channel, where $N_t$ is at least two. Due to channel properties, the signal received by each of receive antennas 110 may be based on signals from multiple transmit antennas. For example, a signal received by each receive antenna may be a linear combination of the signals provided by transmit antennas 104 and 105. Thus, in matrix form, the system of FIG. 1 can be modeled by the equations, $$y = Hx + n, \text{ and} \tag{1}$$

$$\begin{bmatrix} y_1 \\ \vdots \\ y_{N_r} \end{bmatrix} = \begin{bmatrix} h_{11} & h_{12} \\ \vdots & \vdots \\ h_{N_r 1} & h_{N_r 2} \end{bmatrix} \begin{bmatrix} x_1 \\ x_2 \end{bmatrix} + \begin{bmatrix} n_1 \\ \vdots \\ n_{N_r} \end{bmatrix}. \tag{2}$$

Here, equation (2) is an expanded version of equation (1), where y is an $N_r$-dimensional signal vector representing the signals received by the $N_r$ antennas 110 of receiver 112. H is a $N_r \times 2$ matrix representing the effect of channel 106 on a transmitted signal vector, and may sometimes be referred to as a channel response matrix or a channel gain. x is a 2-dimensional signal vector representing the signals transmitted by antennas 104 and 105, and n is an $N_r$-dimensional signal vector representing additive noise 108.

One purpose of providing multiple transmit antennas 104 and 105 and receive antennas 110 in a transmission system may be to create multiple paths through which data may be transmitted. This creates diversity in channel 106, which increases the likelihood that the data is received without the same corruption. In embodiments where there are multiple receive antennas, receiver 112 may employ a diversity combining technique that uses all of the receive antenna inputs to reconstruct the transmitted data. Diversity combining techniques combine the multiple received signals to obtain the single best estimate of the transmitted signal. A diversity combining technique may, for example, select the strongest signal from all the received signals.

In some embodiments, transmitter 102 and receiver 112 may employ a retransmission protocol that allows transmitter 102 to transmit the same information to receiver 112 multiple times. For example, transmitter 102 and receiver 112 may employ an automatic repeat request (ARQ) or hybrid automatic repeat request (HARQ) scheme. When an ARQ or HARQ scheme is used, receiver 112 may include back channel transmitter 115. Transmitter 115 may be operable to send acknowledgement signals back to transmitter 102 through backchannel 107. An affirmative acknowledgement signal may be sent by transmitter 115 in response to a successful transmission, while a negative or no acknowledgement signal may be sent if a transmission is not successful. A successful transmission is one where the received signal y is reconstructed and accepted by receiver 112. Receiver 112 may accept reconstructed information when, for example, it does not detect any errors (e.g., from a CRC check) in the reconstructed information. The reconstruction process may include decoding, diversity combining, signal processing, another technique or a combination thereof.

While the present invention is described primarily with respect to ARQ and HARQ retransmission protocols, it is understood that other retransmission protocols may also be used. For example, a transmission system may employ a repetition coding scheme, where a fixed number of retransmissions are sent for every data packet that is transmitted irrespective of the number of transmissions needed by the receiver. In this case, because retransmission requests may not be needed to implement the retransmission protocol, transmitter 115 may not be needed.

Retransmission protocols, including ARQ and HARQ, conventionally call for sending the same signal during each retransmission attempt. This is disadvantageous in time invariant channels because the retransmissions may be affected by channel corruptions (e.g., from channel 106) in the same way each time, as previously discussed. Thus, the present invention provides embodiments of a transmitter that can transmit different representations of the same data in different retransmission attempts. These representations can be formatted in a manner that is especially suitable for time invariant channels, and may allow a corresponding receiver (e.g., receiver 112 of FIG. 1) to more successfully interpret the signals received from the time invariant channel. Such transmitter embodiments will be described below in connection with FIGS. 2 and 4.

Figure 2A:
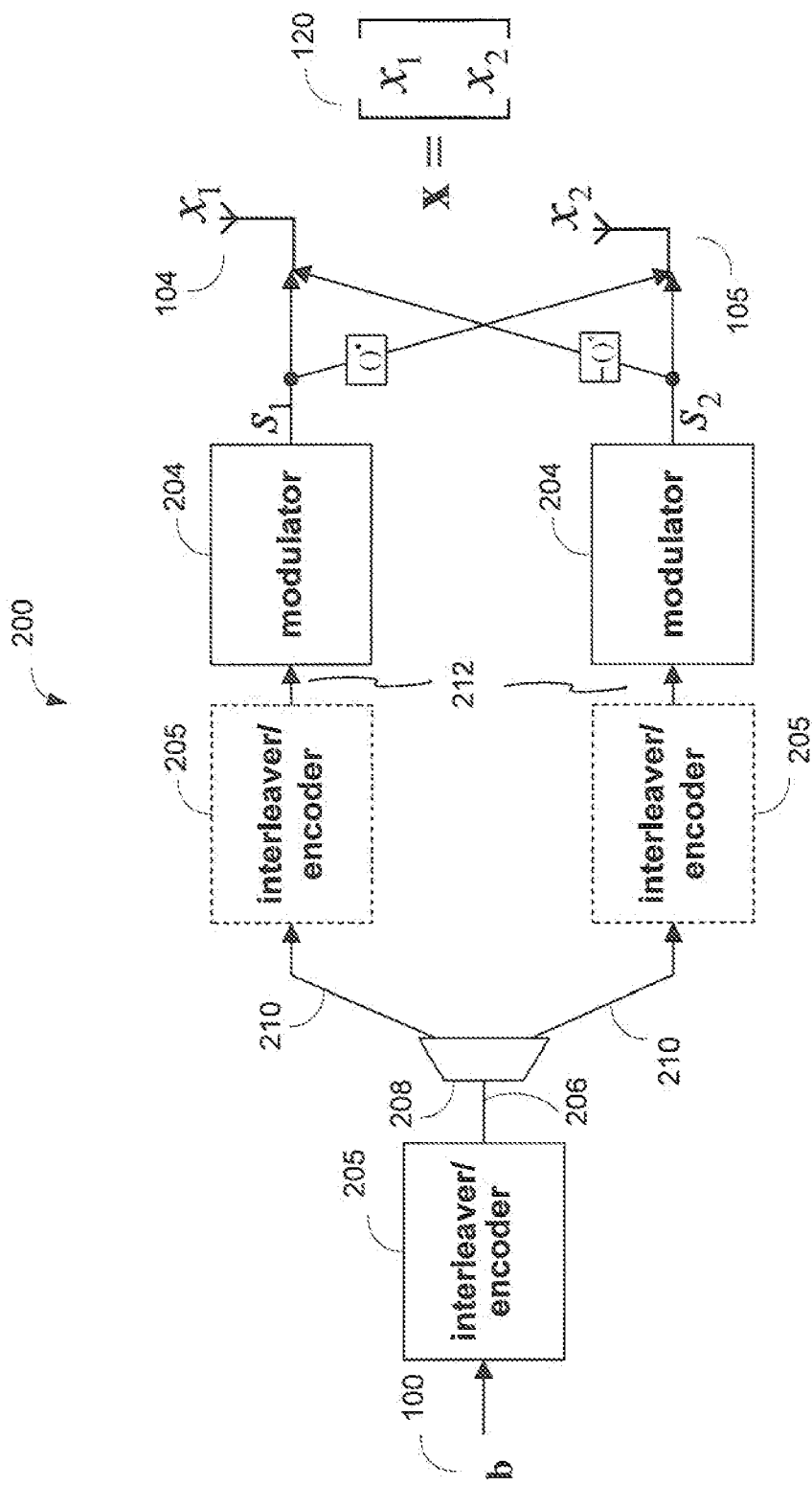
FIG. 2A is a simplified block diagram of a transmitter.

A more detailed, yet still simplified, block diagram of transmitter 102 according to one embodiment of the invention is shown as transmitter 200 in FIG. 2A. Transmitter 200 can include interleaver/encoders 205, demultiplexer 208, and modulators 204 for converting bit sequence 100 into a transmit signal vector x 120 appropriate for transmission through channel 106 of FIG. 1. Bit sequence 100 is passed through interleaver/encoder 205, which may be configured to interleave and/or encode bit sequence 100. If interleaver/encoder 205 is configured to encode bit sequence 100, the encoding may be based on any suitable error correcting or error detecting code (e.g., CRC code, convolutional code, Turbo code, LDPC code). Also, by interleaving bit sequence 100, each bit in bit sequence 100 may be assumed to be independent of all other bits in bit sequence 100. it sequence 206 at the output of interleaver/encoder 205 may be demultiplexed by demultiplexor 208 across two paths 210. Each demultiplexed output 210 may or may not go through another interleaver and/or encoder 205, yielding bit sequences 212.

Modulators 204 convert bit sequences 212 to signals that are appropriate for transmission. For example, modulators 204 may group the incoming bits of sequences 212 into m-bit symbols, which may then be mapped and converted to information bearing signals $s_1$ and $s_2$ according to a signal constellation set and carrier signal. Modulators 204 may use any appropriate type of modulation scheme to produce $s_1$ and $s_2$, such as OFDM, QAM, PAM, and PSK.

Transmitter 200 may also include antennas 104 and 105, which transmit signals $x_1$ and $x_2$, respectively. In some scenarios, transmitter 200 may set transmitted signal $x_1$ to information bearing signal $s_1$ for a period of time, and may set transmitted signal $x_2$ to information bearing signal $s_2$ for that same period of time. Thus, for this period of time, the signals transmitted from antennas 104 and 105 may be equal to, $$x = \begin{bmatrix} x_1 \\ x_2 \end{bmatrix} = \begin{bmatrix} s_1 \\ s_2 \end{bmatrix} = s. \tag{3}$$

The period of time during which equation (3) holds may be referred to as the symbol period, and may be equal to the length of time during which each pair of symbols is transmitted before another pair is transmitted from antennas 104 and 105.

In other scenarios, antenna 104 may transmit the negative conjugate of $s_2$, and antenna 105 may transmit the conjugate of $s_1$:

$$x = \begin{bmatrix} x_1 \\ x_2 \end{bmatrix} = \begin{bmatrix} -s_2^* \\ s_1^* \end{bmatrix} = \breve{s}. \tag{4}$$

While FIG. 2A shows the conjugation and negative conjugation operations being applied to the output of modulators 204, these operations may also occur before the modulation or may be performed by modulators 204.

As described above, in some embodiments, transmitter 200 may be operable to employ a retransmission protocol, such as HARQ, ARQ, or repetition coding. In these embodiments, transmitter 200 may be configured to transmit x=s and x=š each a plurality of times, where s and š are different representations of the same information—$s_1$ and $s_2$. That is, transmitter 200 may employ a space-time coding scheme, and may perform multiple transmission attempts based on different representations of the same data to allow a corresponding receiver (e.g., receiver 112 of FIG. 1) to successfully interpret the information contained in s.

In one embodiment of the present invention, transmitter 200 may transmit x=s on odd-numbered transmission attempts and x=š on even-numbered transmission attempts. By alternating between two different signals on retransmission attempts, transmitter 200 increases the likelihood that a retransmission attempt will succeed. Moreover, selecting š=[−$s_2$* $s_1$*] to be the second transmission signal is particularly advantageous because s and š are then orthogonal. Orthogonal signals may be affected by the same corruptions in maximally different ways, thereby further increasing the likelihood that at least one of the retransmissions will be correctly interpreted by a corresponding receiver or that the original signal may be reconstructed from the two retransmission attempts. A more detailed description of the functional steps that can be taken by transmitter 200 is presented below in connection with FIG. 6.

Transmitter 200 is depicted in FIG. 2A to include two transmit antennas. In other embodiments, transmitter 200 can include more than two antennas (e.g., $N_t$ antennas). In these other embodiments, demultiplexer 208 can decompose bit sequence 206 into $N_t$ separate streams, and transmitter 200 can include $N_t$ interleavers/encoders 205, $N_t$ modulators 204, and $N_t$ transmit antennas (instead of just two) to process/transmit each of the $N_t$ separate streams. Thus, it should be understood that transmitter 200 is not limited to transmitting data from two transmit antennas, and that the depicted embodiment of FIG. 2A is merely illustrative. Thus, it should also be understood that transmitter 200 can employ any suitable space-time code that may involve use of more than two transmit antennas and/or more than two representations (that is, s and š) of the same data.

Figure 2B:
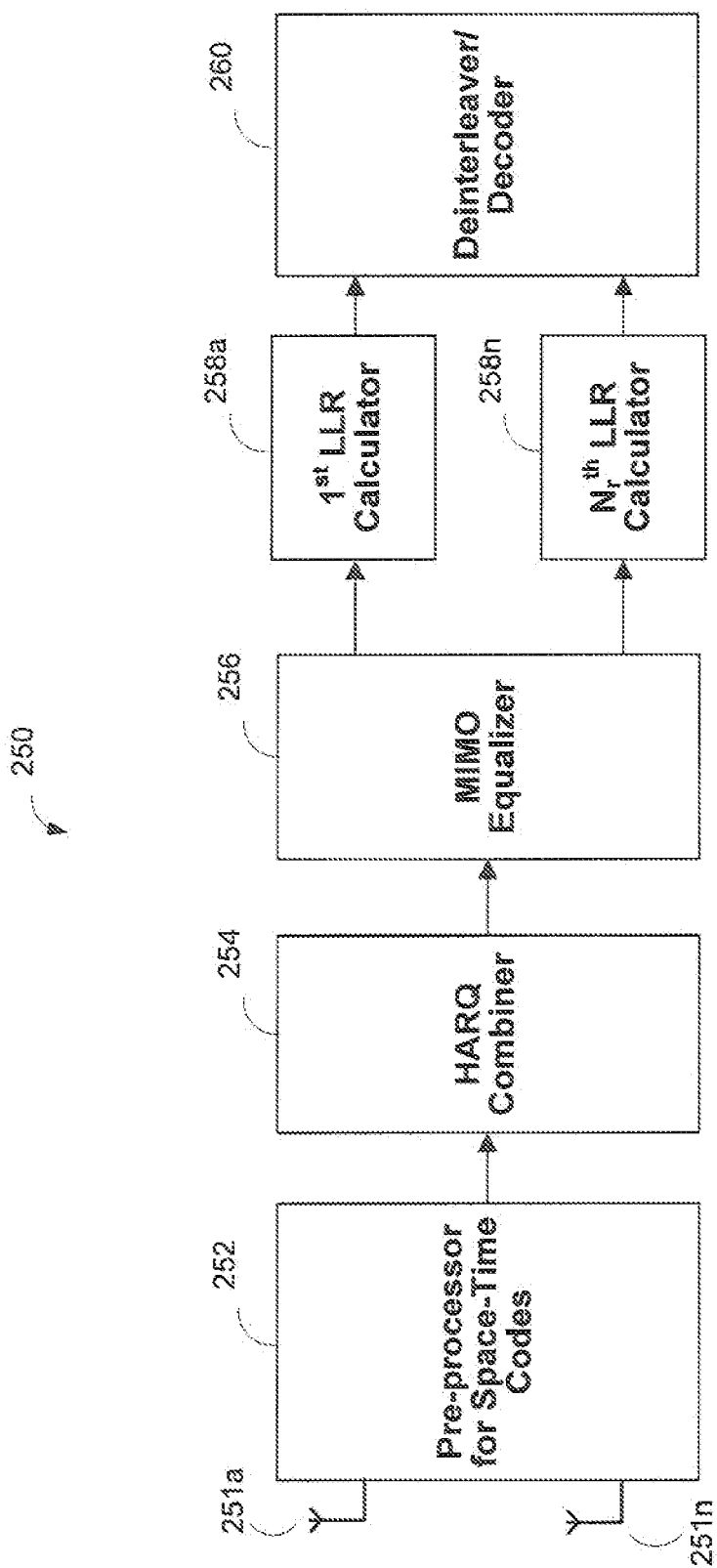
FIGS. 2B and 2C are simplified block diagrams of a receiver.
Figure 2C:
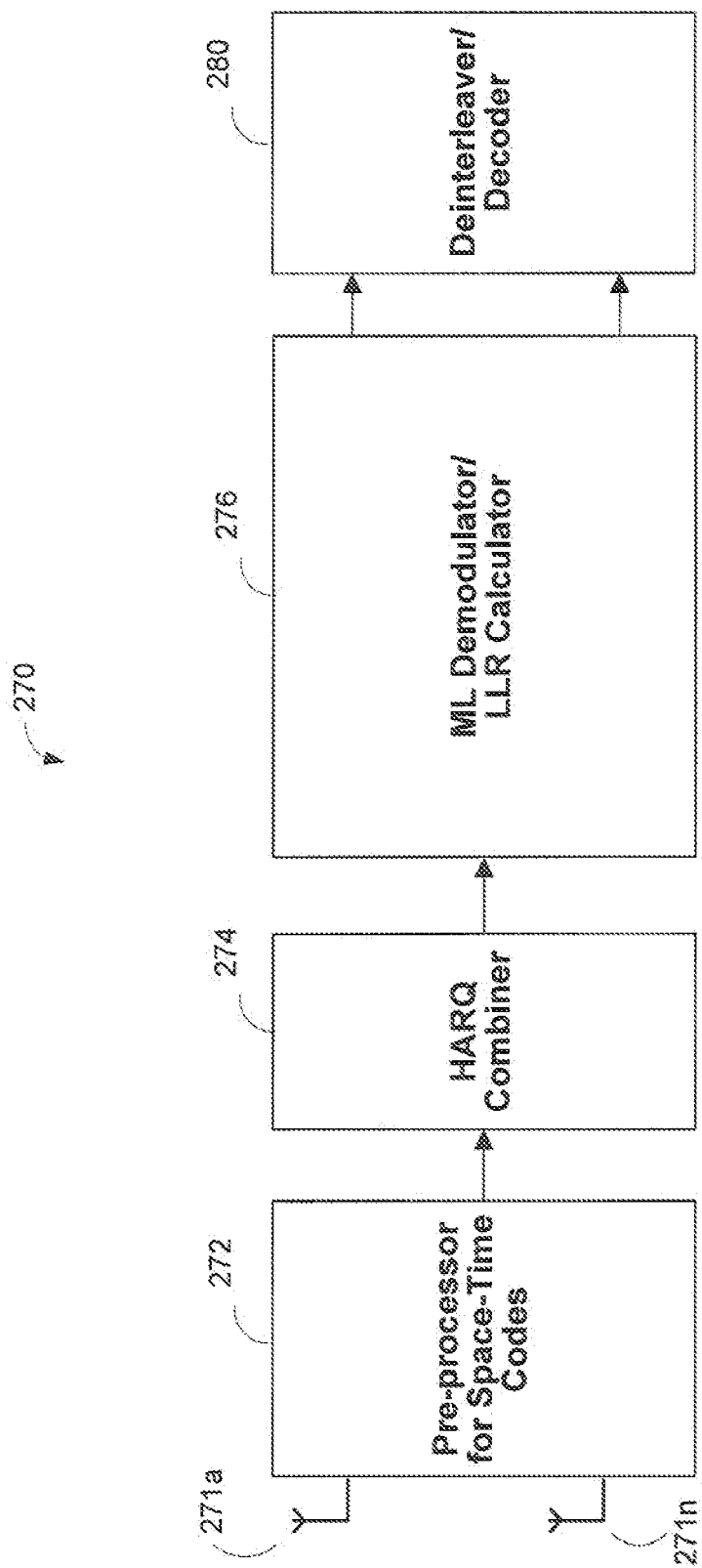

FIGS. 2B and 2C show two block diagrams of illustrative receivers that may be, for example, more detailed representations of receiver 112 in FIG. 1. In particular, FIG. 2B shows a block diagram of illustrative receiver 250 that employs a linear equalization and decoding scheme and FIG. 2C shows a block diagram of illustrative receiver 270 that employs a maximum-likelihood decoding scheme in accordance with two embodiments of the present invention. These receivers may be configured to receive the signal vectors transmitted from transmitter 200 of FIG. 2. However, prior to describing the operation of these receivers, the general mathematical concept used by these receivers for decoding signal vectors received using a space-time coding scheme in accordance with the principles of the present invention will be described in connection with FIGS. 3A and 3B.

A vector model for signals received according to the above-described retransmission scheme is shown in FIG. 3B. For comparison, the vector model of a conventional HARQ retransmission scheme is shown in FIG. 3A. That is, the vector model of FIG. 3A illustrates the scenario where the same information, s, is transmitted from the transmit antennas on each transmission attempt. These models will sometimes be referred to as receive signal models, and can provide a mathematical representation of the received signal vectors in terms of s. In FIG. 3A, matrix 301, sometimes referred to as a received signal matrix, is a matrix of received signals. Each entry $y^{(i)}$ of matrix 301 may be an $N_r$ length vector [$y_1^{(i)}$ $y_2^{(i)}$ ... $y_{N_r}^{(i)}$] corresponding to the signals received from the $N_r$ receiver antenna inputs of a receiver unit (e.g., receiver 112 of FIG. 1). The superscript i may indicate the $i^{th}$ transmission attempt, where 1<i<p in FIG. 1. Thus, each entry of matrix 301 may correspond to a different transmission attempt of s. For example, $y^{(1)}$ may correspond to the signals received from the first and original transmission of s, and $y^{(p)}$ may correspond to the signals received from the $p^{th}$ transmission of s. As matrix 301 includes p entries, FIG. 3A shows the system function after the $p^{th}$ transmission attempt, which may or may not be the final transmission attempt performed by the system.

The signals values for each entry of matrix 301 may depend on the particular channel and noise properties for each transmission attempt. The properties for each transmission attempt may be reflected in the entries of matrix 302 and matrix 303. Matrix 302 includes the channel gain for each transmission attempt, and can represent the properties of the transmission channel (e.g., channel 106 of FIG. 1) on each transmission attempt. In some scenarios, the exact channel gains of matrix 302 may not be known by the transmitter unit, but may be estimated by the receiver unit to reconstruct s. Matrix 303 is a matrix of the additive noise (e.g., additive noise 108 of FIG. 1) that affects each transmission attempt of s.

The vector model shown in FIG. 3A may be decomposed into p individual vector models corresponding to each transmission attempt. Each individual vector model may be expressed by equations (1) and (2), where y is equal to $y^{(i)}$, H is equal to $H^{(i)}$, and n is equal to $n^{(i)}$.

There are several receiver implementations that can effectively receive and decode for s in a transmission or storage system that can be represented by the receive signal model of FIG. 3A. For example, concatenation-assisted symbol-level combining with linear equalization/decoding or maximum-likelihood decoding may be used to process received signal matrix 301. Alternatively, other symbol-level combining or bit-level combining approaches may be contemplated with a receiver unit implementing a linear equalizer, decision feedback equalizer, or maximum likelihood decoding scheme. These and other receiver algorithms and architectures are described in detail in U.S. patent application Ser. No. 11/724,882, filed on Mar. 16, 2007, entitled "CONCATENATION-ASSISTED SYMBOL-LEVEL COMBINING FOR MIMO SYSTEMS WITH HARQ AND/OR REPETITION CODING"; Ser. No. 11/782,556, filed on Jul. 24, 2007, entitled "BIT-LEVEL COMBINING FOR MIMO SYSTEMS WITH HARQ AND/OR REPETITION CODING"; Ser. No. 11/781,208, filed on Jul. 20, 2007, entitled "SYMBOL-LEVEL COMBINING FOR MIMO SYSTEMS WITH HARQ AND/OR REPETITION CODING"; Ser. No. 11/834,466, filed on Aug. 6, 2007, entitled "OPTIMAL LINEAR EQUALIZER FOR MIMO SYSTEMS WITH HARQ AND OR REPETITION CODING"; Ser. No. 11/833,827, filed on Aug. 3, 2007, entitled "DISTANCE-LEVEL COMBINING FOR MIMO SYSTEMS WITH HARQ AND/OR REPETITION CODING"; Ser. No. 11/834,599, filed on Aug. 6, 2007, entitled "MAXIMAL RATIO COMBINING OF EQUALIZED SYMBOLS FOR MIMO SYSTEMS WITH HARQ AND/OR REPETITION CODING"; Ser. No. 11/839,004, filed on Aug. 15, 2007, entitled "LOW-COMPLEXITY SCALABLE ARCHITECTURE FOR CONCATENATION-ASSISTED SYMBOL-LEVEL COMBINING"; Ser. No. 11/781,200, filed on Jul. 20, 2007, entitled "SYMBOL-LEVEL COMBINING FOR MIMO SYSTEMS WITH HARQ AND/OR REPETITION CODING"; and 60/911,151, filed on Apr. 11, 2007, entitled "MIMO Decision Feedback Equalizer Design with Hybrid ARQ". All of these prior applications are hereby incorporated by reference herein in their entirety.

FIG. 3B shows the vector model of a transmission system that transmits x=s and x=š in alternating transmission attempts. Thus, FIG. 3B may be a vector model for the retransmission protocol discussed above in connection with FIG. 2A. Like matrix 301 of FIG. 3A, matrix 311 may be a received signal matrix that includes entries for the signals received in each transmission attempt, where the odd-numbered rows correspond to transmissions of s, and the even-numbered rows correspond to transmissions of š. Matrices 312 and 311 may correspond the channel and noise properties that produce matrix 311. In order to recover the information bearing signal vector s 305 from the transmitted signal š in the even-number transmission attempts, pre-processing conjugation operations may be applied to appropriate components of matrices 311, 312, and 313. Thus, matrix 311 is a received signal matrix after a pre-processing conjugation operation has been applied to the even-numbered rows. Similarly in channel gain matrix 312 and additive noise matrix 313, a conjugate operation has been applied to the even-numbered rows of each respective matrix.

Note that by applying the appropriate pre-processing operations on the appropriate transmission attempts, the receive signal model of FIG. 3B has a similar form as signal model of FIGS. 3A—for example, both signal models are written in terms of s, an effective channel matrix, and an effective AWGN noise vector. Therefore, any of the receiver processing and decoding approaches that can be used for the received signal model of FIG. 3A may be applied to the received signal model of FIG. 3B. Once the appropriate pre-processing steps are taken by a receiver, the receiver may implement any of the combining and decoding strategies discussed in the above-incorporated applications. As mentioned briefly above, illustrative block diagrams of such receivers are shown in FIGS. 2B and 2C.

Referring first to FIG. 2B, a block diagram of receiver 250 is shown that can include receive antennas 251a through 251n, pre-processor 252, HARQ combiner 254, MIMO equalizer 256, LLR calculators 258a through 259n, and deinterleaver/decoder 260. The signals transmitted from the two or more transmit antennas of the corresponding transmitter (e.g., transmitter 102 of FIG. 1 or transmitter 200 of FIG. 2A) may be received by the $N_r$ receive antennas. That is, each of the $N_r$ receive antennas may receive some information on all of the symbols transmitted from the two or more transmit antennas. Pre-processor 252 may be a pre-processor for space-time codes, and can process the received signal vector. Pre-processor 252 may function to convert the different representations of $s_1$ and $s_2$ into a similar form. That is, pre-processor 252 may selectively perform the conjugation operations on even-numbered transmission attempts discussed above in connection with FIG. 3B to produce the received signal model of FIG. 3B. Receiver 250 can include control logic (not shown) that implements and keeps track of the current state of the retransmission protocol. The control logic may, for example, control whether pre-processor 252 is bypassed (e.g., for odd-numbered attempts) or used (e.g., for even-numbered transmission attempts).

The remaining components of receiver 250 may then treat the pre-processed received signals as if s, and not different representations of s, had been transmitted on every transmission attempt. Each of the remaining components may have any of the features and functionalities described in the above-incorporated applications and will therefore not be described in detail here. In particular, each of the remaining components may implement any of the linear-decoding approaches discussed in these incorporated applications, such as any of the zero-forcing (ZF) or minimum-mean-squared-error (MMSE) approaches. First, HARQ combiner 254 can combine the pre-processed signals using any suitable technique, such as using a form of maximal-ratio combining. The combined signals may then be equalized by equalizer 256, which may in some embodiments be a ZF or MMSE equalizer, to produce $N_r$ streams of independent information. The $N_r$ LLR calculators 258a through 258n may compute soft information for each stream of information in the form of, for example, log-likelihood ratios (LLRs). Deinterleaver/decoder 260 may then deinterleave (if necessary) and perform soft-decoding on the resulting soft information. Using these components, receiver 250 may attempt to recover the original information (e.g., bit sequence 100) that was transmitted by the corresponding transmitter (e.g., transmitter 102 of FIG. 1 or transmitter 200 of FIG. 2A).

Referring now to FIG. 2C, a block diagram of receiver 270 is shown that, unlike in receiver 250 of FIG. 2B, employs a maximum-likelihood (ML) decoding scheme. Receiver 270 can include receive antennas 271a through 271n, pre-processor 272, HARQ combiner 274, ML demodulator 276, and deinterleaver/decoder 280. Pre-processor 272 may have any of the features and functionalities of pre-processor 252 of FIG. 2B, and can effectively create a receive signal model such as that shown in FIG. 3B. Thus, the remaining components of FIG. 2C may have any of the features and functionalities of the maximum-likelihood decoding implementations described in the above-incorporated applications, and will not be described in detail here. Generally, the pre-processed signal vector that includes information from multiple transmissions may be combined by HARQ combiner 274, demodulated and decoded by ML demodulator/LLR calculator 276, and deinterleaved and soft-decoded by deinterleaver/decoder 280. At the output of deinterleaver/decoder 280, an estimate of the original transmitted information (e.g., bit sequence 100 of FIG. 1) is produced.

Up to this point in the disclosure, only a space-time code with two transmit antennas and two representations of the same information (e.g., x=s and x=š) has been provided as an example to illustrate the principles of the present invention. This, however, is merely illustrative and is not intended to limit the present invention. Generally, the retransmission approach of transmitting different representations of the same data on different transmission attempts may be applied to space-time codes with more than two representations of the same data and using more than two transmit antennas. For example, the following equation is a simple space-time block code for four transmit antennas:

$$x^{(1)} = \begin{bmatrix} x_1 \\ x_2 \\ x_3 \\ x_4 \end{bmatrix} = s = \begin{bmatrix} s_1 \\ s_2 \\ s_3 \\ 0 \end{bmatrix} \quad (5)$$

$$x^{(2)} = \begin{bmatrix} x_1 \\ x_2 \\ x_3 \\ x_4 \end{bmatrix} = s' = \begin{bmatrix} -s_2^* \\ s_1^* \\ 0 \\ -s_3 \end{bmatrix}$$

$$x^{(3)} = \begin{bmatrix} x_1 \\ x_2 \\ x_3 \\ x_4 \end{bmatrix} = s'' = \begin{bmatrix} -s_3^* \\ 0 \\ s_1^* \\ s_2 \end{bmatrix}$$

$$x^{(4)} = \begin{bmatrix} x_1 \\ x_2 \\ x_3 \\ x_4 \end{bmatrix} = s''' = \begin{bmatrix} 0 \\ s_3^* \\ -s_2^* \\ s_1 \end{bmatrix}$$

Here the transmitter may transmit signals of the form x=[$x_1$ $x_2$ $x_3$ $x_4$], where each component of the vector signal x corresponds to the output of one antenna. The superscript on x indicates the time slot during which the signal is transmitted.

That is, $x^{(i)}$ is the signal vector that is transmitted in the $i^{th}$ time slot. Thus, rather than alternately transmitting two different signal vectors s and š like in the two antenna embodiment, four different signal vectors s, s', s'', and s''' are transmitted in turn. Like in the two transmit antenna case, signal vectors s, s', s'', and s''' are different representations of the same information.

This particular example illustrates a space-time code with spatial rate 3/4, since three data symbols ($s_1$, $s_2$, and $s_3$) are transmitted over four antennas ($x_1$, $x_2$, $x_3$, and $x_4$). However, other types of space-time codes for an arbitrary number of transmit antennas and symbols can also be used with the present data transmission system.

As in the two transmit antenna embodiment, pre-processor 252 (FIG. 2B) and pre-processor 272 (FIG. 2C) may be configured to pre-process the signals received on their corresponding receive antennas such that each transmission can be written in terms of the same representation regardless of the number of different representations or transmit antennas used.

By solving the receive signal model of FIG. 3B, receiver 250 (FIG. 2B) and receiver 270 (FIG. 2C) may utilize all of the information from each transmission attempt, and do not need to discard any of the received information. These receivers can therefore operate based on multiple pairs of orthogonal signal vectors, which may be especially advantageous for decoding signal vectors received from time invariant channels. Accordingly, the transmission protocol discussed above in connection with FIGS. 2 and 3B may be an effective approach for providing information to a corresponding receiver unit through a time invariant channel.

Figure 4:
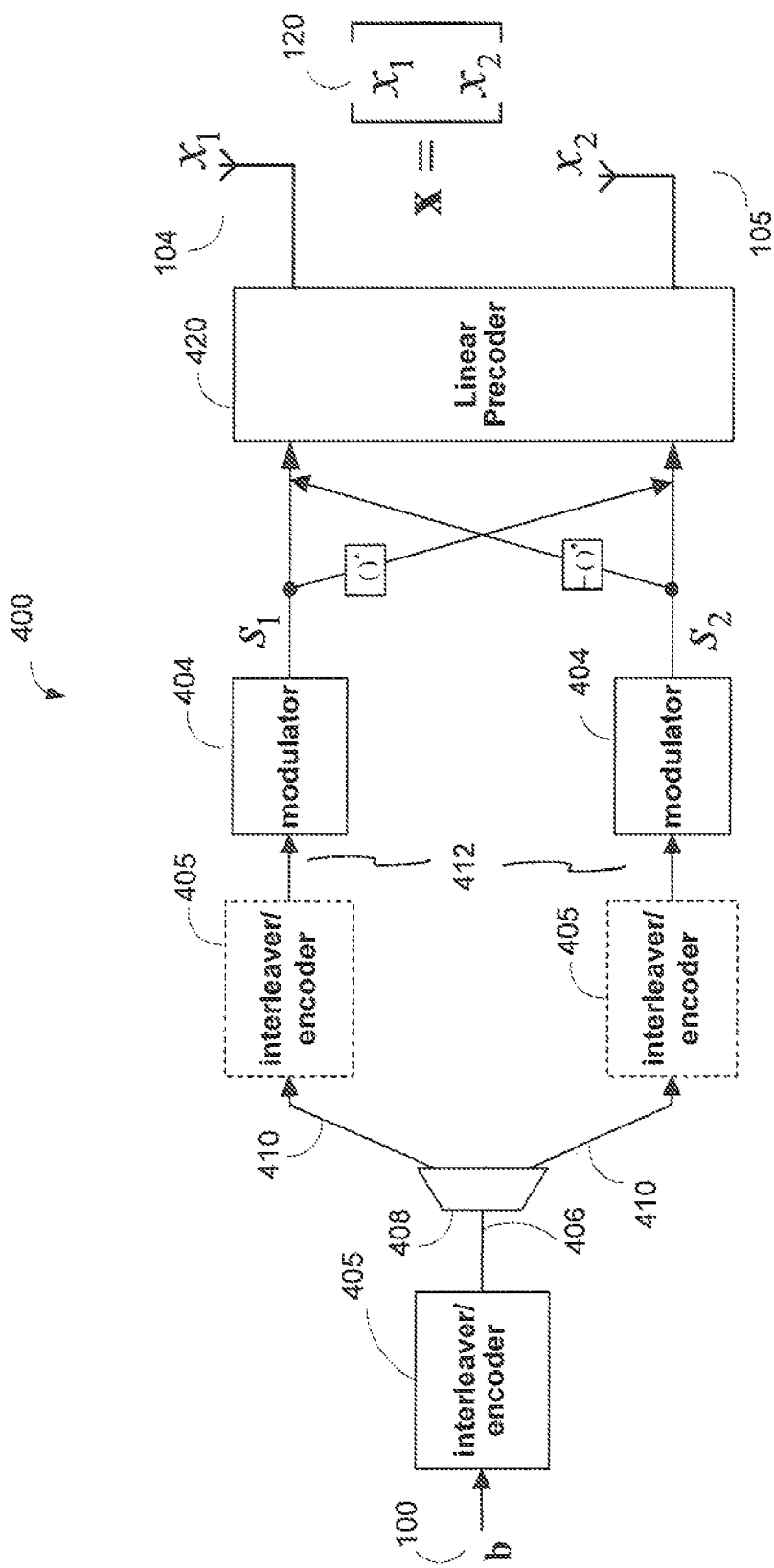
FIG. 4 is a simplified block diagram of a transmitter that employs precoding.

Now with reference to FIG. 4, there is shown a more detailed, yet still simplified, block diagram of transmitter 102 according to another embodiment of the invention. Like transmitter 200 of FIG. 2A, transmitter 400 converts bit sequence 100 into a transmit signal vector x 120 appropriate for transmission through channel 106 of FIG. 1, and can include many components with similar features and functionalities as those in FIG. 2A. Also like in transmitter 200, interleaver/encoder 405 may generate bit sequence 406 from bit sequence 100. The output of interleaver/encoder 405 may be demultiplexed by demultiplexor 408 across two paths 410. Each demultiplexed output 410 may or may not go through another interleaver and/or encoder 405, yielding bit sequences 412. Modulators 404 may convert bit sequences 412 into signals that are appropriate for transmission, such as information bearing signals $s_1$ and $s_2$.

Like transmitter 200, transmitter 400 can compute š from s, which are defined above in equations (3) and (4). However, instead of directly transmitting x=s or x=š, transmitter 400 transmits x after performing linear precoding on information bearing signals s and š. Linear precoder 420 may perform this linear precoding operation, and can generate x by multiplying s and š by a precoding matrix $A^{(i)}$ such that:

$$x^{(i)} = \begin{cases} A^{((i+1)/2)}s & \text{for } i = 1, 3, \ldots \\ A^{(i/2)}š & \text{for } i = 2, 4, \ldots, \end{cases} \quad (6)$$

where i is the transmission attempt number. Equation (6) indicates that the same precoding matrix is used for pairs of transmission attempts, starting from attempts 1 and 2, followed by 3 and 4, and so on. Thus, a new precoding matrix is used every second transmission. Since the same precoding matrix is applied to orthogonal signals s and š, the orthogonality of consecutive transmit signal pairs is preserved. After precoder 420 generates $x^{(i)}$ from s and š, transmitter 400 transmits $x^{(i)}$ sequentially with increasing i until either a transmission is successful or the transmission is aborted. The $x_1$ component of x is transmitted from antenna 104 and the $x_2$ component is transmitted from antenna 105.

In some embodiments, the precoding matrix can be chosen such that an effective transmission channel $H_e^{(i)}$ is created that maximizes the diversity gain of the system. The effective transmission channel created by precoder 420 is:

$$H_e^{(i)} = \begin{cases} H^{(i)}A^{((i+1)/2)} & \text{for } i = 1, 3, \ldots \\ H^{(i)}A^{(i/2)} & \text{for } i = 2, 4, \ldots, \end{cases} \quad (7)$$

where $H^{(i)}$ represents the actual channel characteristics. Precoding matrix $A^{(i)}$ is chosen to change the apparent characteristics of the channel so that the effective channel matrix is more orthogonal than the actual channel matrix. Precoding matrix $A^{(i)}$ may be a Givens rotation matrix, a Vandermonde matrix, a Fourier matrix, a Hadamard matrix or another type of matrix. A more detailed description of the functional steps taken by transmitter 400 is presented below in connection with FIG. 7.

A vector model of the above-described retransmission scheme is shown in FIG. 5. It is substantially equal to the model in FIG. 3B, except channel gain matrix 512 now includes entries for the effective channel rather than the actual channel. The vector model demonstrates the operations that a receiver pre-processor (e.g., pre-processor 252 (FIG. 2B) or pre-processor 272 (FIG. 2C)) may need to perform to recover s from multiple received signal vectors $y^{(1)}$ through $y^{(p)}$. Thus, referring briefly back to FIGS. 2B and 2C, in some embodiments, receivers 250 and 270 may be configured to process signals received from transmitter 400. Receivers 250 and 270 may have any of the features and functionalities previously described, except that the combining/processing/decoding schemes employed by these receivers may utilize the effective channel matrix (including information on the precoding matrix) rather than the channel matrix associated with just the channel. That is, once the appropriate pre-processing is completed by pre-processors 252 or 272, receivers 250 and 270 may be configured to combine/process/decode the pre-processed received signal vector shown in FIG. 5.

Because the vector model of FIG. 5 may be written in terms of s, and can include information on all of the transmission attempts performed thus far, a receiver unit operable to recover s from receive signal matrix 511 can advantageously utilize all of the information on s that it receives. Thus, the receiver unit (e.g., receivers 250 or 270 of FIGS. 2B and 2C) can attempt to recover s based on all of the transmission attempts, where the transmitted signals for each pair of transmission attempts is orthogonal and based on a different precoding matrix. In some scenarios, these benefits may allow the receiver unit to recover the information in s using a minimal number of retransmissions.

Referring again to FIGS. 2B and 2C, pre-processors 252 and 272 may selectively process received signal vectors. For example, for the two transmit antenna space-time coding scheme discussed above in connection with FIG. 2A, pre-processors 252 and 272 may only process signal vectors that correspond to even transmission attempts and may bypass processing for signal vectors that correspond to odd transmission attempts. Since receivers 250 and 270 can include control logic (not shown) for selectively changing the operation of pre-processors 252 and 272, receivers 250 and 270 may be operable to change and/or disable the space-time coding strategy during operation. For example, receivers 250 and 270 may determine that space-time coding is not necessary (e.g., by determining that the transmission channel is high quality), and may (along with the corresponding transmitter) switch to a spatial diversity retransmission scheme that transmits s on every retransmission attempt. In this scenario, pre-processors 252 and 272 may be bypassed completely until a space-time coding scheme is resumed. Thus, receivers 250 and 270 are advantageously flexible to allow different transmission protocols and coding schemes to be utilized in order to optimize the performance or speed of the transmission/storage system.

Figure 6:
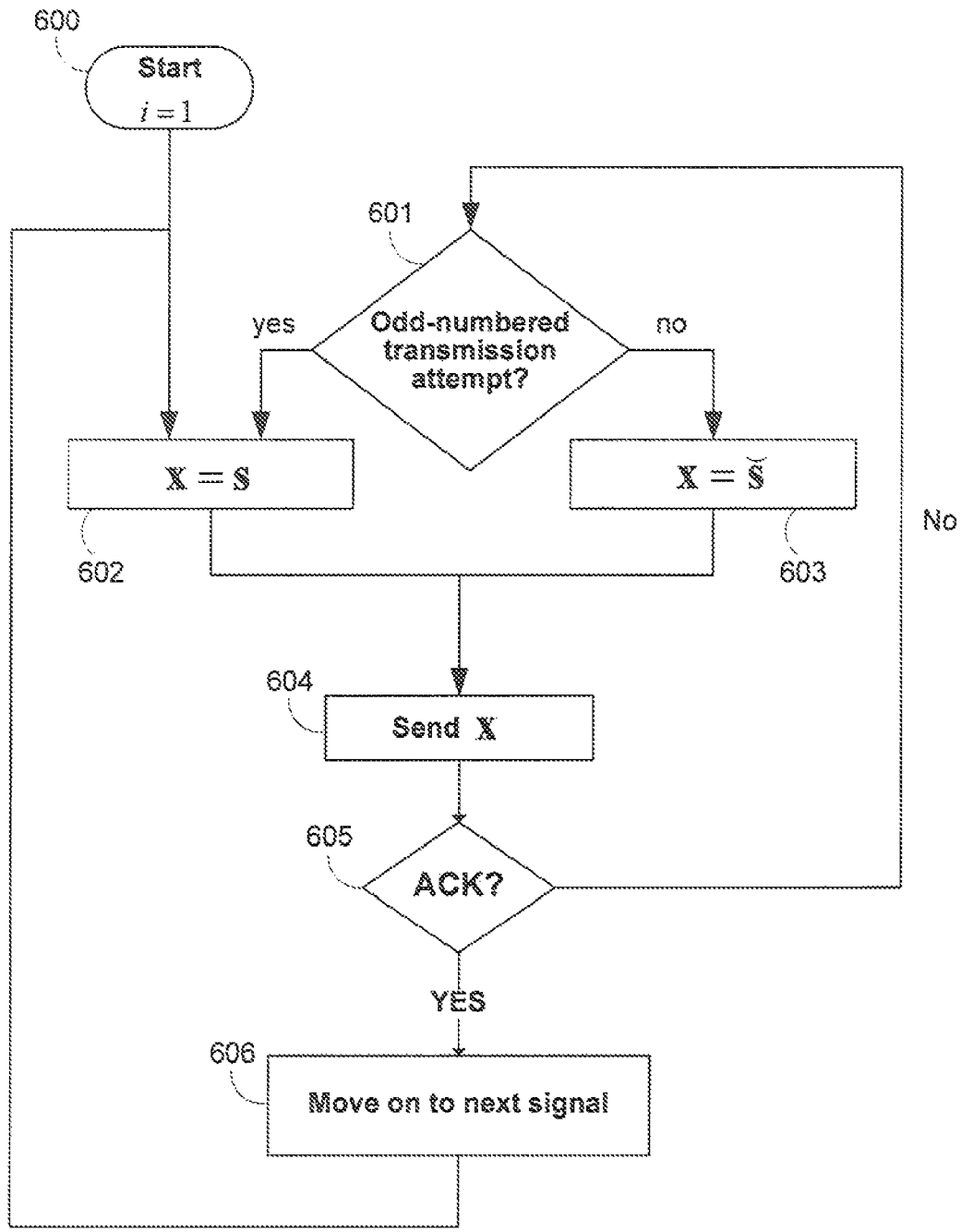
FIG. 6 is a flowchart illustrating the operation of a transmitter that employs a HARQ retransmission protocol.

FIG. 6 is a flowchart that describes an illustrative process that can be performed by a transmitter in accordance with HARQ protocol and the principles of one embodiment of the invention. The steps of the illustrative process may be performed, for example, by a transmitter with any of the features and functionalities of transmitter 200 in FIG. 2A. The process of FIG. 6 may begin at step 600 with the first (i=1) transmission attempt. At step 602, the transmitter may select a given information bearing signal to transmit as signal x through a transmission channel (e.g., channel 106 of FIG. 1). Signal s may be a signal vector with two signal components, such as the signal vector given by equation (3) above. Then, at step 604, the transmitter may send the selected signal through the transmission channel to a receiver unit (e.g., receiver 112 of FIG. 1). At step 605, the transmitter can determine whether it has received an acknowledgement signal from a corresponding receiver. If an acknowledgement signal is received by the transmitter at step 605, then the process can continue to step 606. In this case, no retransmission may be necessary and the transmitter can move on to transmit the next information bearing signal at step 606. If no acknowledgement signal or a negative acknowledgement signal is received at step 605, the process of FIG. 6 can move to step 601, where the transmitter can attempt a retransmission.

At step 601, the transmitter can determine if the present transmission attempt number is even or odd. If it is odd, the process can move to step 602. At step 602, the transmitter can select signal s to transmit. Signal s may be the same signal that was transmitted on the first transmission attempt. If, at step 601, the transmitter determines that the present transmission attempt is even, then the transmitter selects signal š to transmit at step 603. Signal š may represent the same information as signal s, but may be in a different format. For example, if signal s is a signal vector given by equation (3), signal š may be the signal vector given by equation (4). At step 604, the selected signal (e.g., s or š) is transmitted, and the process can continue on to step 605. According to HARQ protocol, consecutive attempts may continue until the transmission succeeds or is aborted. This space-time coding scheme is an extension of the Alamouti scheme for HARQ retransmission in MIMO systems.

Figure 7:
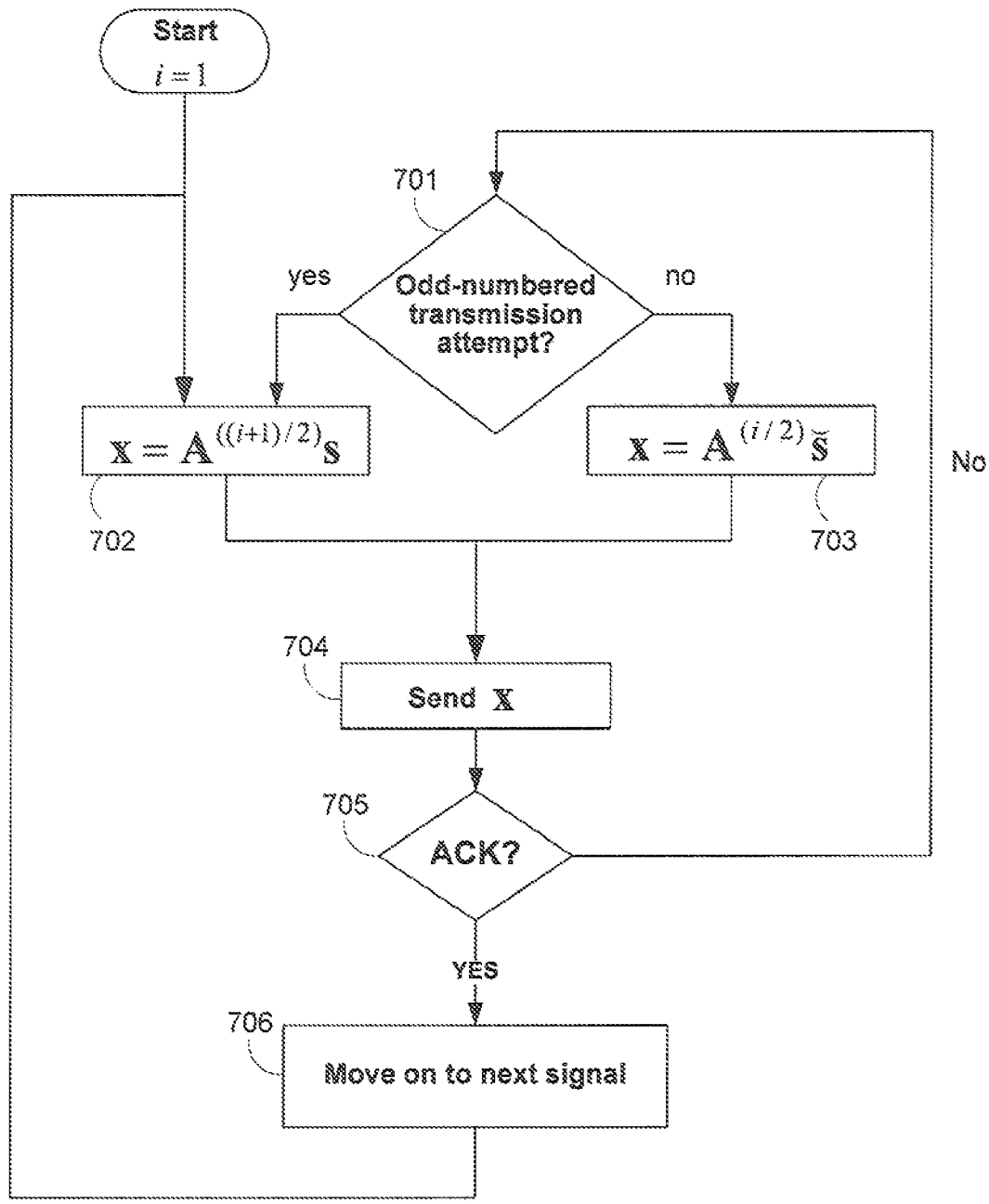
FIG. 7 is a flowchart illustrating the operation of a transmitter that employs precoding and a HARQ retransmission protocol.

FIG. 7 shows a flowchart detailing the steps taken by a transmitter when transmitting a signal s in accordance with HARQ protocol and the principles of an embodiment of the present invention. The steps of this illustrative process may be performed, for example, by a transmitter with any of the features and functionalities of transmitter 400 in FIG. 4. In many aspects, FIG. 7 may be substantially the same as FIG. 6, and therefore any descriptions of the steps in FIG. 6 may apply to corresponding steps in FIG. 7. One exception to this may be at steps 702 and 703, where transmit signal x is equal to a precoded version of s and š instead of s and š themselves. Thus, FIG. 7 illustrates the precoding technique described above in connection with FIG. 4 that allows an improved effective channel to be created for each pair of transmission attempts.

It should be understood that the flowcharts of FIGS. 6 and 7 are merely illustrative. Any of the steps in these processes may be omitted, modified, combined, and/or rearranged, and any additional steps may be performed, without departing from the scope of the invention.

Referring now to FIGS. 8-14, various exemplary implementations of the present invention are shown.

Figure 8:
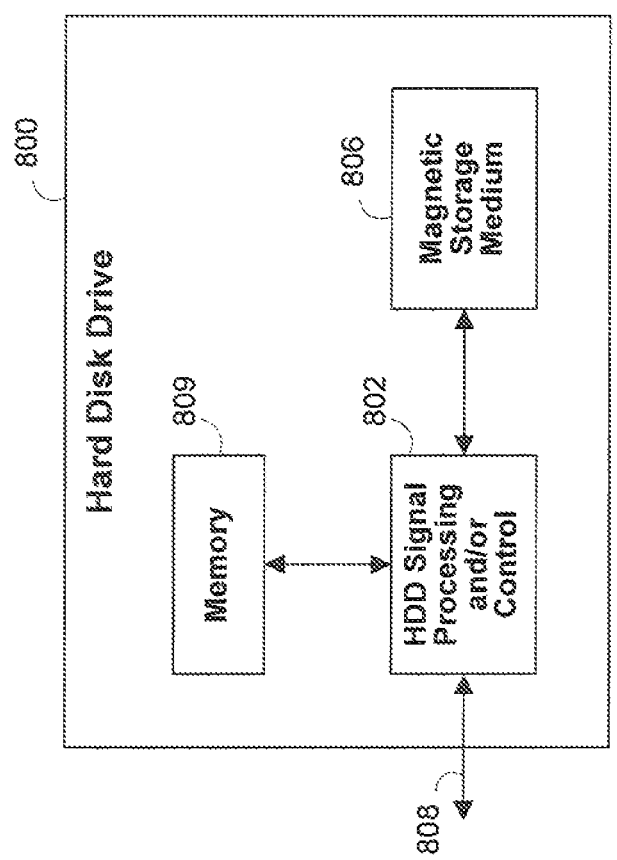
FIG. 8 is a block diagram of an exemplary hard disk drive that can employ the disclosed technology.

Referring now to FIG. 8, the present invention can be implemented in a hard disk drive (HDD) 800. The present invention may implement either or both signal processing and/or control circuits, which are generally identified in FIG. 8 at 802. In some implementations, the signal processing and/or control circuit 802 and/or other circuits (not shown) in the HDD 800 may process data, perform coding and/or encryption, perform calculations, and/or format data that is output to and/or received from a magnetic storage medium 806.

The HDD 800 may communicate with a host device (not shown) such as a computer, mobile computing devices such as personal digital assistants, cellular phones, media or MP3 players and the like, and/or other devices via one or more wired or wireless communication links 808. The HDD 800 may be connected to memory 809 such as random access memory (RAM), nonvolatile memory such as flash memory, read only memory (ROM) and/or other suitable electronic data storage.

Figure 9:
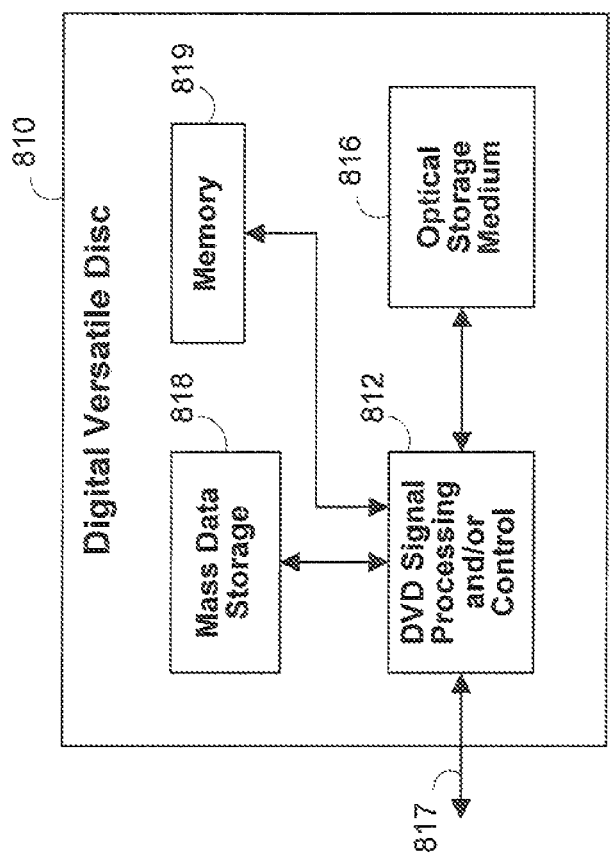
FIG. 9 is a block diagram of an exemplary digital versatile disc that can employ the disclosed technology.

Referring now to FIG. 9, the present invention can be implemented in a digital versatile disc (DVD) drive 810. The present invention may implement either or both signal processing and/or control circuits, which are generally identified in FIG. 9 at 812, and/or mass data storage 818 of the DVD drive 810. The signal processing and/or control circuit 812 and/or other circuits (not shown) in the DVD drive 810 may process data, perform coding and/or encryption, perform calculations, and/or format data that is read from and/or data written to an optical storage medium 816. In some implementations, the signal processing and/or control circuit 812 and/or other circuits (not shown) in the DVD drive 810 can also perform other functions such as encoding and/or decoding and/or any other signal processing functions associated with a DVD drive.

The DVD drive 810 may communicate with an output device (not shown) such as a computer, television or other device via one or more wired or wireless communication links 817. The DVD drive 810 may communicate with mass data storage 818 that stores data in a nonvolatile manner. The mass data storage 818 may include a hard disk drive (HDD). The HDD may have the configuration shown in FIG. 8. The HDD may be a mini HDD that includes one or more platters having a diameter that is smaller than approximately 1.8". The DVD drive 810 may be connected to memory 819 such as RAM, ROM, nonvolatile memory such as flash memory and/or other suitable electronic data storage.

Figure 10:
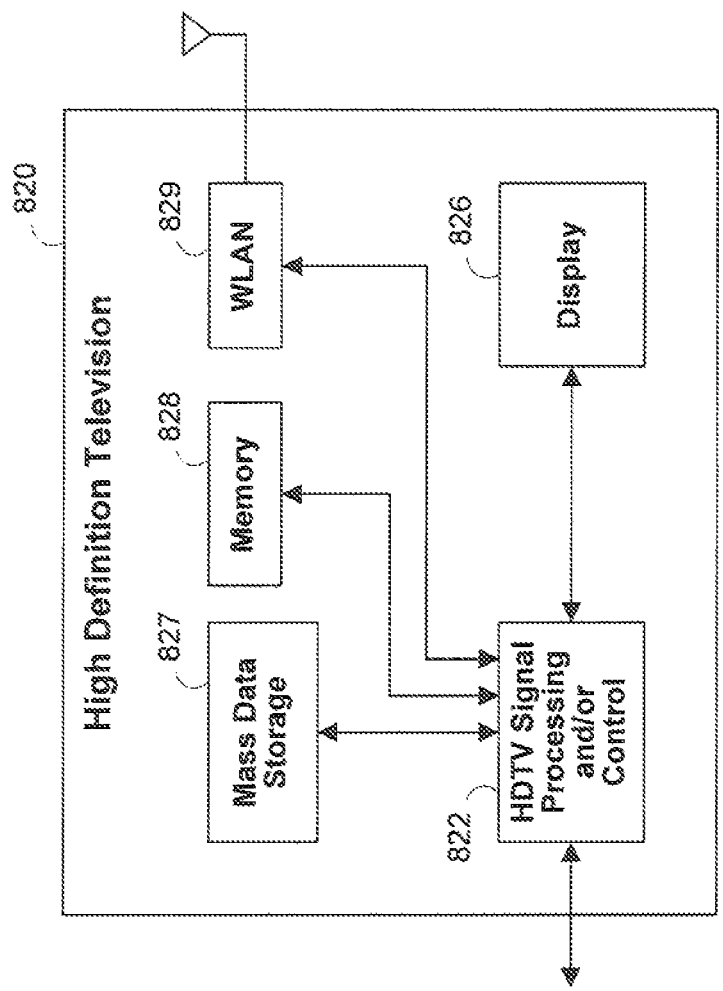
FIG. 10 is a block diagram of an exemplary high definition television that can employ the disclosed technology.

Referring now to FIG. 10, the present invention can be implemented in a high definition television (HDTV) 820. The present invention may implement either or both signal processing and/or control circuits, which are generally identified in FIG. 10 at 822, WLAN network interface 829 and/or mass data storage 827 of the HDTV 820. The HDTV 820 receives HDTV input signals in either a wired or wireless format and generates HDTV output signals for a display 826. In some implementations, signal processing circuit and/or control circuit 822 and/or other circuits (not shown) of the HDTV 820 may process data, perform coding and/or encryption, perform calculations, format data and/or perform any other type of HDTV processing that may be required.

The HDTV 820 may communicate with mass data storage 827 that stores data in a nonvolatile manner such as optical and/or magnetic storage devices for example hard disk drives and/or DVDs. At least one HDD may have the configuration shown in FIG. 8 and/or at least one DVD may have the configuration shown in FIG. 9. The HDD may be a mini HDD that includes one or more platters having a diameter that is smaller than approximately 1.8". The HDTV 820 may be connected to memory 828 such as RAM, ROM, nonvolatile memory such as flash memory and/or other suitable electronic data storage. The HDTV 820 also may support connections with a WLAN via a WLAN network interface 829.

Figure 11:
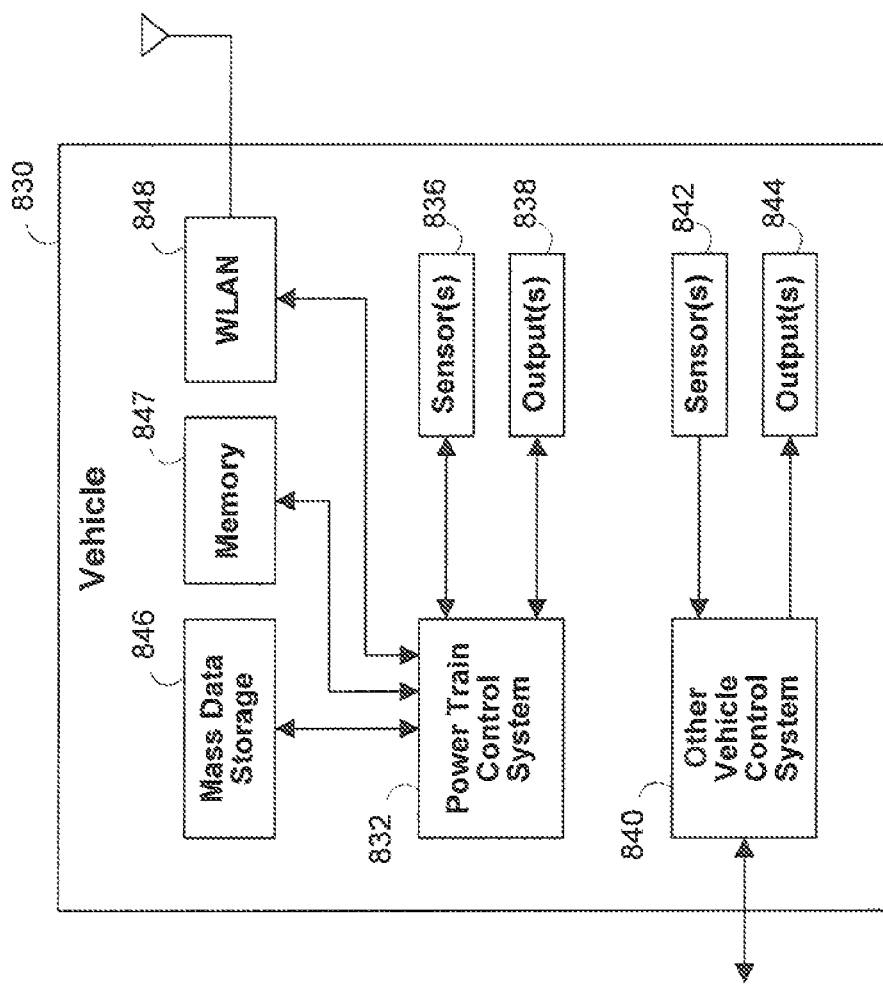
FIG. 11 is a block diagram of an exemplary vehicle that can employ the disclosed technology.

Referring now to FIG. 11, the present invention implements a control system of a vehicle 830, WLAN network interface 848 and/or mass data storage 846 of the vehicle control system. In some implementations, the present invention may implement a powertrain control system 832 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 840 of the vehicle 830. The control system 840 may likewise receive signals from input sensors 842 and/or output control signals to one or more output devices 844. In some implementations, the control system 840 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 832 may communicate with mass data storage 846 that stores data in a nonvolatile manner. The mass data storage 846 may include optical and/or magnetic storage devices for example hard disk drives and/or DVDs. At least one HDD may have the configuration shown in FIG. 8 and/or at least one DVD may have the configuration shown in FIG. 9. The HDD may be a mini HDD that includes one or more platters having a diameter that is smaller than approximately 1.8". The powertrain control system 832 may be connected to memory 847 such as RAM, ROM, nonvolatile memory such as flash memory and/or other suitable electronic data storage. The powertrain control system 832 also may support connections with a WLAN via a WLAN network interface 848. The control system 840 may also include mass data storage, memory and/or a WLAN network interface (all not shown).

Figure 12:
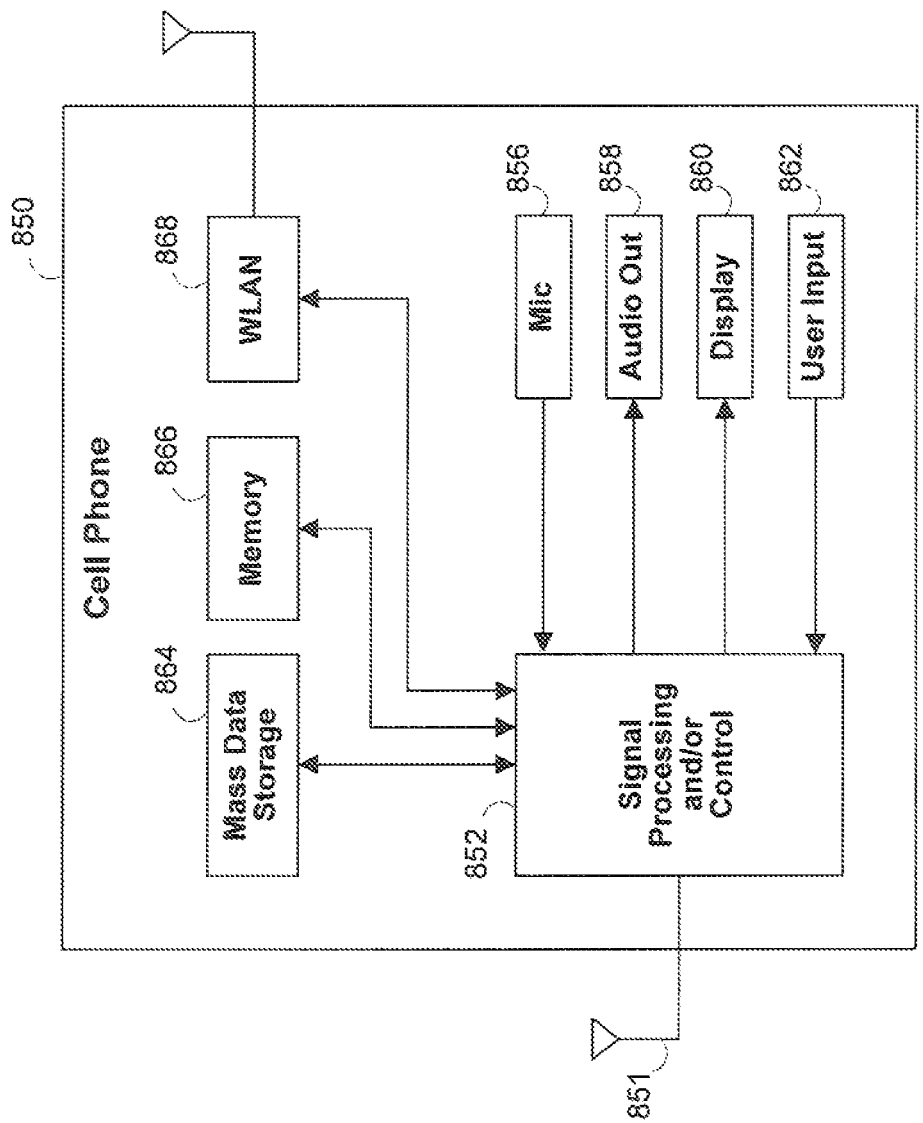
FIG. 12 is a block diagram of an exemplary cell phone that can employ the disclosed technology.

Referring now to FIG. 12, the present invention can be implemented in a cellular phone 850 that may include a cellular antenna 851. The present invention may implement either or both signal processing and/or control circuits, which are generally identified in FIG. 12 at 852, a WLAN network interface 868 and/or mass data storage 864 of the cellular phone 850. In some implementations, the cellular phone 850 includes a microphone 856, an audio output 858 such as a speaker and/or audio output jack, a display 860 and/or an input device 862 such as a keypad, pointing device, voice actuation and/or other input device. The signal processing and/or control circuits 852 and/or other circuits (not shown) in the cellular phone 850 may process data, perform coding and/or encryption, perform calculations, format data and/or perform other cellular phone functions.

The cellular phone 850 may communicate with mass data storage 864 that stores data in a nonvolatile manner such as optical and/or magnetic storage devices for example hard disk drives and/or DVDs. At least one HDD may have the configuration shown in FIG. 8 and/or at least one DVD may have the configuration shown in FIG. 9. The HDD may be a mini HDD that includes one or more platters having a diameter that is smaller than approximately 1.8". The cellular phone 850 may be connected to memory 866 such as RAM, ROM, nonvolatile memory such as flash memory and/or other suitable electronic data storage. The cellular phone 850 also may support connections with a WLAN via a WLAN network interface 868.

Figure 13:
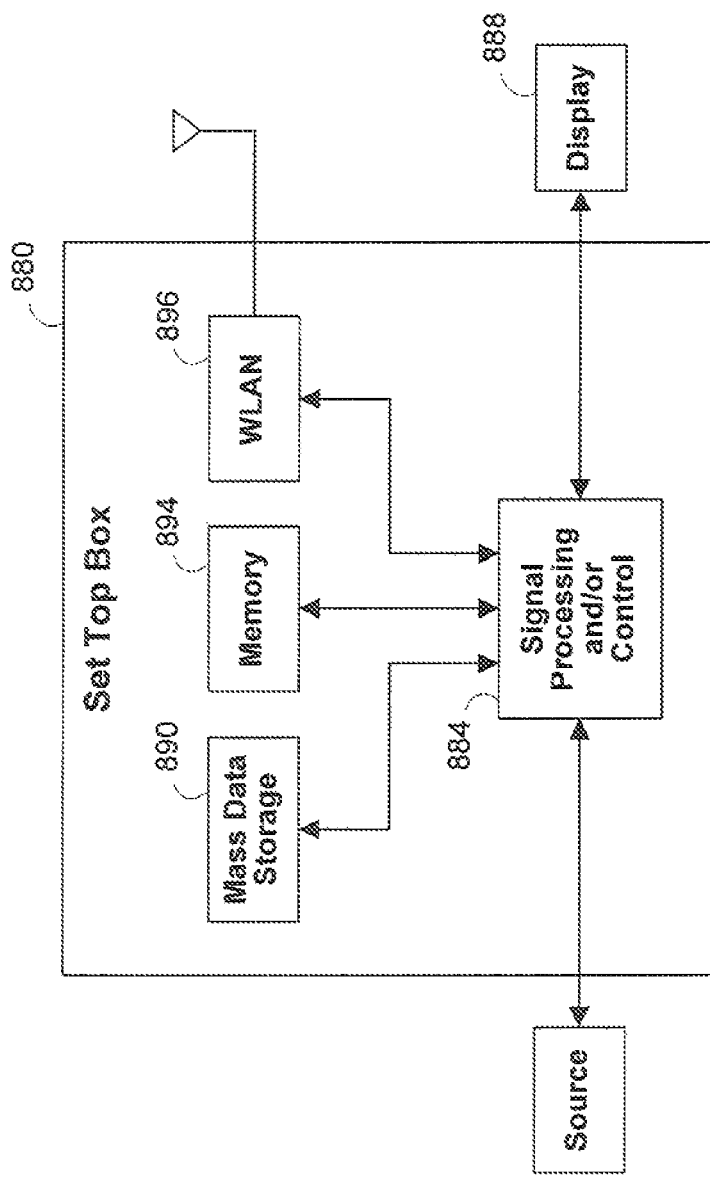
FIG. 13 is a block diagram of an exemplary set top box that can employ the disclosed technology.

Referring now to FIG. 13, the present invention can be implemented in a set top box 880. The present invention may implement either or both signal processing and/or control circuits, which are generally identified in FIG. 13 at 884, WLAN network interface 896 and/or mass data storage 890 of the set top box 880. The set top box 880 receives signals from a source such as a broadband source and outputs standard and/or high definition audio/video signals suitable for a display 888 such as a television and/or monitor and/or other video and/or audio output devices. The signal processing and/or control circuits 884 and/or other circuits (not shown) of the set top box 880 may process data, perform coding and/or encryption, perform calculations, format data and/or perform any other set top box function.

The set top box 880 may communicate with mass data storage 890 that stores data in a nonvolatile manner. The mass data storage 890 may include optical and/or magnetic storage devices for example hard disk drives and/or DVDs. At least one HDD may have the configuration shown in FIG. 8 and/or at least one DVD may have the configuration shown in FIG. 9. The HDD may be a mini HDD that includes one or more platters having a diameter that is smaller than approximately 1.8". The set top box 880 may be connected to memory 894 such as RAM, ROM, nonvolatile memory such as flash memory and/or other suitable electronic data storage. The set top box 880 also may support connections with a WLAN via a WLAN network interface 896.

Figure 14:
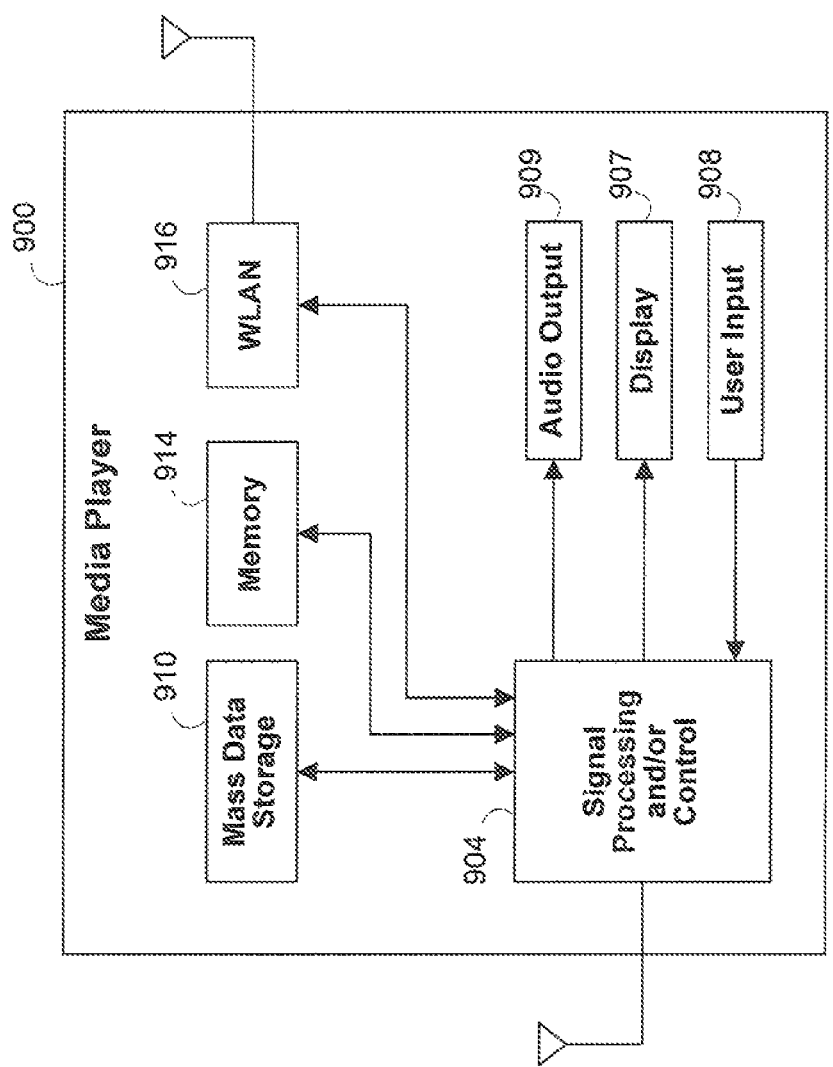
FIG. 14 is a block diagram of an exemplary media player that can employ the disclosed technology.

Referring now to FIG. 14, the present invention can be implemented in a media player 900. The present invention may implement either or both signal processing and/or control circuits, which are generally identified in FIG. 14 at 904, WLAN network interface 916 and/or mass data storage 910 of the media player 900. In some implementations, the media player 900 includes a display 907 and/or a user input 908 such as a keypad, touchpad and the like. In some implementations, the media player 900 may employ a graphical user interface (GUI) that typically employs menus, drop down menus, icons and/or a point-and-click interface via the display 907 and/or user input 908. The media player 900 further includes an audio output 909 such as a speaker and/or audio output jack. The signal processing and/or control circuits 904 and/or other circuits (not shown) of the media player 900 may process data, perform coding and/or encryption, perform calculations, format data and/or perform any other media player function.

The media player 900 may communicate with mass data storage 910 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives and/or DVDs. At least one HDD may have the configuration shown in FIG. 8 and/or at least one DVD may have the configuration shown in FIG. 9. The HDD may be a mini HDD that includes one or more platters having a diameter that is smaller than approximately 1.8". The media player 900 may be connected to memory 914 such as RAM, ROM, nonvolatile memory such as flash memory and/or other suitable electronic data storage. The media player 900 also may support connections with a WLAN via a WLAN network interface 916. Still other implementations in addition to those described above are contemplated.

The foregoing describes systems and methods for transmitting a receiving information using a retransmission protocol with space-time coding. Those skilled in the art will appreciate that the invention can be practiced by other than the described embodiments, which are presented for the purpose of illustration rather than of limitation.

What is claimed is:

1. A transmitter for transmitting an information bearing signal vector s through a transmission channel using a retransmission protocol, the transmitter comprising:
   a modulator configured to produce at least two different signal vectors s and š, wherein signal vector s comprises at least two information symbols $s_1$ and $s_2$ and wherein signal vector š comprises at least two information symbols $š_1$ and $š_2$ that are different from information symbols $s_1$ and $s_2$, respectively;
   a precoder configured to precode s and š;
   at least two transmit antennas configured to transmit the precoded s and the precoded š; and
   control logic configured to,
      in response to a negative acknowledgement signal being received:
         transmit the precoded š from the at least two transmit antennas on even-numbered transmission attempts of the information bearing signal vector s in the retransmission protocol, and
         transmit the precoded s from the at least two transmit antennas on odd-numbered transmission attempts of the information bearing signal vector s in the retransmission protocol,
      wherein the precoder is configured to precode the signal vector š, which is different from the signal vector s being transmitted, on the even-numbered transmission attempts of the signal vector s in the retransmission protocol.

2. The transmitter of claim 1, wherein the at least two transmit antennas comprise no more than two transmit antennas.

3. The transmitter of claim 2, wherein s=$[s_1\ s_2]$ and š=$[-s_2^*\ s_1^*]$.

4. The transmitter of claim 1, wherein the retransmission protocol is a hybrid automatic repeat request (HARQ) protocol.

5. The transmitter of claim 1, wherein the retransmission protocol is a repetition coding protocol.

6. The transmitter of claim 1, wherein the precoder is configured to multiply s and š by a precoding matrix.

7. The transmitter of claim 6, wherein the precoding matrix is equal to:
   $A^{((i+1)/2)}$ on an $i^{th}$ transmission attempt of the information bearing signal vector s in the retransmission protocol, where i is an odd integer; and
   $A^{(i/2)}$ on an $i^{th}$ transmission attempt of the information bearing signal vector s in the retransmission protocol, where i is an even integer.

8. The transmitter of claim 6, wherein the precoding matrix is a Givens rotation matrix, a Vandermonde matrix, a Fourier matrix, or a Hadamard matrix.

9. The transmitter of claim 1, wherein the precoder produces an effective channel having greater diversity gain than the transmission channel.

10. The transmitter of claim 1 wherein:
    in response to the negative acknowledgement signal being received, the precoder is configured to precode the signal vector š for transmitting the signal vector s.

11. The transmitter of claim 10 wherein:
    the modulator is configured to produce the signal vector š from the signal vector s, wherein each of signal vector s and signal vector š comprises different representations of at least two information symbols $s_1$ and $s_2$; and
    in response to the negative acknowledgement signal being received, the precoder is configured to precode the signal vector š for transmitting the signal vector s, wherein precoding š comprises encoding š using a time-space code.

12. The transmitter of claim 1 wherein precoding s and š depends on an index of the respective ones of the even-numbered and the odd-numbered transmission attempts of the information bearing signal vector s in the retransmission protocol.

13. A receiver for decoding different representations of an information bearing signal vector received through a transmission channel using a retransmission protocol and a transmitter, wherein the different representations are precoded using at least one precoding matrix, the receiver comprising:
    at least one receive antenna configured to receive the different representations of the information bearing signal on different transmission attempts of the information bearing signal vector in the retransmission protocol, wherein a retransmission attempt is executed after a negative acknowledgement signal is sent from the receiver to the transmitter at the end of a failed preceding transmission attempt;
    a pre-processor configured to convert the different representations of the information bearing signal vector into a same format;
    a combiner configured to combine the preprocessed signal vector from each transmission attempt into a combined signal vector; and
    at least one decoder for decoding the combined signal vector, wherein at least one of the combiner and the decoder operate using an effective channel matrix that includes information on the transmission channel and the at least one precoding matrix, and wherein the precoding matrix is configured to precode the signal vector š, which is different from the signal vector s being transmitted, on the even-numbered transmission attempts of the signal vector s in the retransmission protocol.

14. The receiver of claim 13, further comprising a plurality of receive antennas, wherein the different representations of s are received by each of the receive antennas.

15. The receiver of claim 13, wherein the different representations of s comprise a first signal vector s=$[s_1\ s_2]$ and a second signal vector š=$[-s_2^*\ s_1^*]$, where $s_1$ is a first information bearing signal and $s_2$ is a second information bearing signal.

16. The receiver of claim 15, wherein the first signal vector is received on odd-numbered transmission attempts of the retransmission scheme and the second signal vector is received on even-numbered transmission attempts of the retransmission scheme.

17. The receiver of claim 13, wherein the at least one precoding matrix is equal to:

$A^{((i+1)/2)}$ on an $i^{th}$ transmission attempt of the information bearing signal vector s in the retransmission protocol, where i is an odd integer; and $A^{(i/2)}$ on an $i^{th}$ transmission attempt of the information bearing signal vector s in the retransmission protocol, where i is an even integer.

18. A method of transmitting an information bearing signal vector s through a transmission channel using a retransmission protocol, the method comprising:

producing a signal vector š, wherein signal vector s comprises at least two information symbols $s_1$ and $s_2$ and wherein signal vector š comprises at least two information symbols $š_1$ and $š_2$ that are different from information symbols $s_1$ and $s_2$, respectively;

precoding the signal vectors s and š; and in response to a negative acknowledgement signal being received:

transmitting the precoded signal vector š on even-numbered transmission attempts of the information bearing signal vector s in the retransmission protocol, and transmitting the precoded signal vector s on odd-numbered transmission attempts of the information bearing signal vector s in the retransmission protocol, wherein the precoding comprises precoding the signal vector š, which is different from the signal vector s being transmitted, on the even-numbered transmission attempts of the signal vector s in the retransmission protocol.

19. The method of claim 18, wherein s=[$s_1$ $s_2$] and š=[$-s_2^*$ $s_1^*$].

20. The method of claim 18, wherein the retransmission protocol is a hybrid automatic repeat request (HARQ) protocol.

21. The method of claim 17, wherein the precoding matrix is equal to:

$A^{((i+1)/2)}$ on an $i^{th}$ transmission attempt of the information bearing signal vector s in the retransmission protocol, where i is an odd integer; and $A^{(i/2)}$ on an $i^{th}$ transmission attempt of the information bearing signal vector s in the retransmission protocol, where i is an even integer.

22. The method of claim 17, wherein multiplying the signal vectors s and š by a precoding matrix produces an effective channel having greater diversity gain than the transmission channel.

* * * * *